United States Patent
Yashiki

(10) Patent No.: US 9,879,116 B2
(45) Date of Patent: Jan. 30, 2018

(54) BROMINE-CONTAINING POLYETHER POLYMERS AND METHODS FOR PRODUCING THE SAME

(71) Applicant: MANAC INC., Hiroshima (JP)

(72) Inventor: Katsuyori Yashiki, Hiroshima (JP)

(73) Assignee: Manac Inc., Hiroshima (JP)

( * ) Notice: Subject to any disclaimer, the term of this patent is extended or adjusted under 35 U.S.C. 154(b) by 0 days.

(21) Appl. No.: 15/115,351

(22) PCT Filed: Jan. 30, 2015

(86) PCT No.: PCT/JP2015/052735
§ 371 (c)(1),
(2) Date: Jul. 29, 2016

(87) PCT Pub. No.: WO2015/115611
PCT Pub. Date: Aug. 6, 2015

(65) Prior Publication Data
US 2017/0002140 A1    Jan. 5, 2017

(30) Foreign Application Priority Data
Feb. 3, 2014   (JP) .................. 2014-018165

(51) Int. Cl.
C08G 65/22 (2006.01)
C08G 65/14 (2006.01)
C08G 65/26 (2006.01)
C09K 21/14 (2006.01)

(52) U.S. Cl.
CPC .......... *C08G 65/223* (2013.01); *C08G 65/14* (2013.01); *C08G 65/2609* (2013.01); *C09K 21/14* (2013.01); *C08G 2650/22* (2013.01); *C08G 2650/46* (2013.01); *C08L 2201/02* (2013.01)

(58) Field of Classification Search
CPC .................................................. C08G 65/223
See application file for complete search history.

(56) References Cited

U.S. PATENT DOCUMENTS

| | | |
|---|---|---|
| 3,392,145 A | 7/1968 | Garty et al. |
| 4,618,619 A | 10/1986 | Regel et al. |
| 6,008,283 A | 12/1999 | Rose et al. |
| 6,255,440 B1 | 7/2001 | Okawa et al. |
| 2006/0148948 A1 | 7/2006 | Bar-Yaakov et al. |
| 2010/0331497 A1 | 12/2010 | Vogel et al. |
| 2011/0091508 A1* | 4/2011 | Esfand ............... A61L 31/04 424/400 |

FOREIGN PATENT DOCUMENTS

| | | |
|---|---|---|
| CN | 101717341 A | 6/2010 |
| EP | 2617473 A1 | 7/2013 |
| JP | S59-184107 A | 10/1984 |
| JP | S60-228469 A | 11/1985 |
| JP | S62-190257 A | 8/1987 |
| JP | S63-113012 A | 5/1988 |
| JP | S64-71702 A | 3/1989 |
| JP | H10-273552 A | 10/1998 |
| JP | 2000-095829 A | 4/2000 |
| JP | 2001-517256 A | 10/2001 |
| JP | 2006-515035 A | 5/2006 |
| WO | 2008/134294 A1 | 11/2008 |

OTHER PUBLICATIONS

Zhang2004 (Abstract)(Yingyong Huaxue (2004), 21(3), 301-304).*
Zhang2004 (Yingyong Huaxue (2004) 21(3) 301-304).*
Zhang2004 (Yingyong Huaxue (2004) 21(3) 301-304)(Translation).*
International Search Report issued in PCT/JP2015/052735 dated Apr. 28, 2015 (2 pages).
Written Opinion of the International Searching Authority issued in PCT/JP2015/052735 dated Apr. 28, 2015 (4 pages).
Yang, Biao; "Active Thinner for Fire Retarding Epoxy Resins"; Tuliao Gongye, 1984, vol. 78, pp. 39-42 (5 pages).
"Optimal prescription and combustion test of flame retardant", Technical Information Institute Co., Ltd., 2011, pp. 79-80.
Office Action issued in corresponding Chinese Application No. 201580006944.2 with English translation dated May 10, 2017 (14 pages).
Zhang, Tian-lin "The Synthesis of High-reactive Structural and Flame Retardant Polyether Polyol" Journal of Huaihai Institute of Technology vol. 12, No. 3, Sep. 2003 (4 pages).
Extended European Search Report issued in corresponding European Application No. 15743259.2 dated Aug. 9, 2017 (6 pages).
Maslosh et al. "Comparative evaluation of the fireproofing efficiency of some bromine-containing oligoethers," Izvestiya Vysshikh Uchebnykh Zavedenii, Khimiya I Khimicheskaya Tekhnologiya, 34(5), 101-4 CODEN: Ivukar; Issn: 0579-2991, 1991, Abstract (2 pages).

\* cited by examiner

*Primary Examiner* — Kuo-Liang Peng
(74) *Attorney, Agent, or Firm* — Osha Liang LLP

(57) ABSTRACT

The present invention relates to a polymer including repeating units of the following general formula (1):

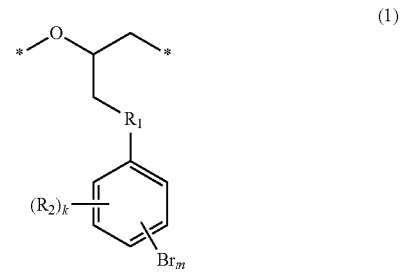

(1)

wherein $R_1$, $R_2$, m, k and the asterisks are as defined in the specification and the claims, and wherein the bromine content in the polymer being 45 to 80 wt %, as well as to a method for producing such polymers.

14 Claims, 26 Drawing Sheets

BROMINE-CONTAINING POLYETHER POLYMERS AND METHODS FOR PRODUCING THE SAME

TECHNICAL FIELD

The present invention relates to bromine-containing polyether polymers, flame retardants including the bromine-containing polyether polymers, and methods for producing the polymers and flame retardants.

BACKGROUND ART

Plastics are materials that are indispensable in modern society. In general, plastic materials are susceptible to heat and are ignited or catch fire at a relatively low temperature. For fire-safety reasons, plastics used in electric or electronic devices, vehicle components and household articles should be resistant to the spread of fire. Thus, flame retardants are added to plastics to decrease their flammability. Some main flame retardants are bromine flame retardants, phosphorus flame retardants and inorganic flame retardants.

In particular, bromine flame retardants are categorized into monomer types and oligomer or polymer types. Recently, high-molecular weight oligomer- or polymer-type flame retardants are considered to be more environmentally friendly and safer for the human health, and are reported to outperform monomer-type flame retardants in various characteristics (for example, non-blooming properties and mechanical characteristics) (see, for example, "NAN-NEN-ZAI NO SAITEKI SHOHOU TO NENSHOU SHIKEN (optimum formulations of flame retardants and flame tests)", TECHNICAL INFORMATION INSTITUTE CO., LTD., 2011, pp. 79-80, and WO 2008/134294).

For example, some main oligomer- or polymer-type flame retardants are brominated polystyrenes, brominated polyphenylene ethers, brominated benzyl acrylate polymers, brominated polycarbonate oligomers and brominated epoxies. These oligomer- or polymer-type bromine flame retardants are not applicable to all kinds of plastics and have inherent problems (see, for example, Japanese Patent Kohyo Publication No. 2001-517256).

While oligomer- or polymer-type flame retardants are used in marketplaces as described above, they are still incapable of satisfying all the performances required. Thus, those skilled in the art constantly demand new types of flame retardants.

PRIOR ART DOCUMENTS

Patent Documents

Patent Document 1: WO 2008/134294
Patent Document 2: Japanese Patent Kohyo Publication No. 2001-517256

Non Patent Documents

Non Patent Document 1: "NAN-NEN-ZAI NO SAITEKI SHOHOU TO NENSHOU SHIKEN (optimum formulations of flame retardants and flame tests)", TECHNICAL INFORMATION INSTITUTE CO., LTD., 2011, pp. 79-80

SUMMARY OF INVENTION

Problem to be Solved by the Invention

The present invention provides novel bromine-containing polymers which have excellent thermal stability and a high bromine content in the polymer to realize the reduction in flammability in a decreased dose, and methods for producing such polymers.

Means for Solving the Problem

The present inventor has carried out extensive studies in order to solve the problems discussed hereinabove, and has completed the present invention as a result. An aspect of the present invention is as follows.

A polymer including repeating units of the following general formula (1):

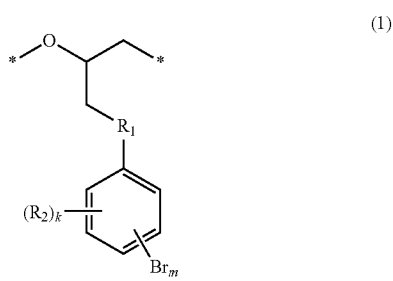

(wherein
m is an integer of 2 to 5,
k is 5−m,
$R_1$ is an oxygen atom, a NH group or a sulfur atom,
$R_2$ is a hydrogen atom, a fluorine atom, a chlorine atom, an iodine atom, a $C_{1-4}$ alkyl group, a $C_{1-4}$ alkoxy group, a $C_{1-4}$ alkylthio group, a $C_{1-4}$ haloalkyl group, a $C_{1-4}$ haloalkoxy group, a vinyl group, a nitro group, a cyano group, an aldehyde group, an amino group, a hydroxyl group, a thiol group, a sulfo group, a sulfonamide group, or a carboxyl group or ester group, and, when k is 2 or greater, $R_2$'s may be the same as or different from one another, and
the asterisks each indicate an end of the polymer or a bond to other structural unit), and
wherein the bromine content in the polymer is 45 to 80 wt %. Other aspects of the present invention reside in a flame retardant including the polymer, and methods for producing the polymers and flame retardants.

Effect of the Invention

The present invention provides the bromine-containing polyether polymers that have a high bromine content and are useful as flame retardants. The polymers of the present invention have excellent thermal stability and are applicable even to resins that are processed at high temperatures. Further, the addition of the polymers to plastics potentially ensures good melt flow properties and non-blooming properties.

EMBODIMENTS TO CARRY OUT THE INVENTION

Figure 1:
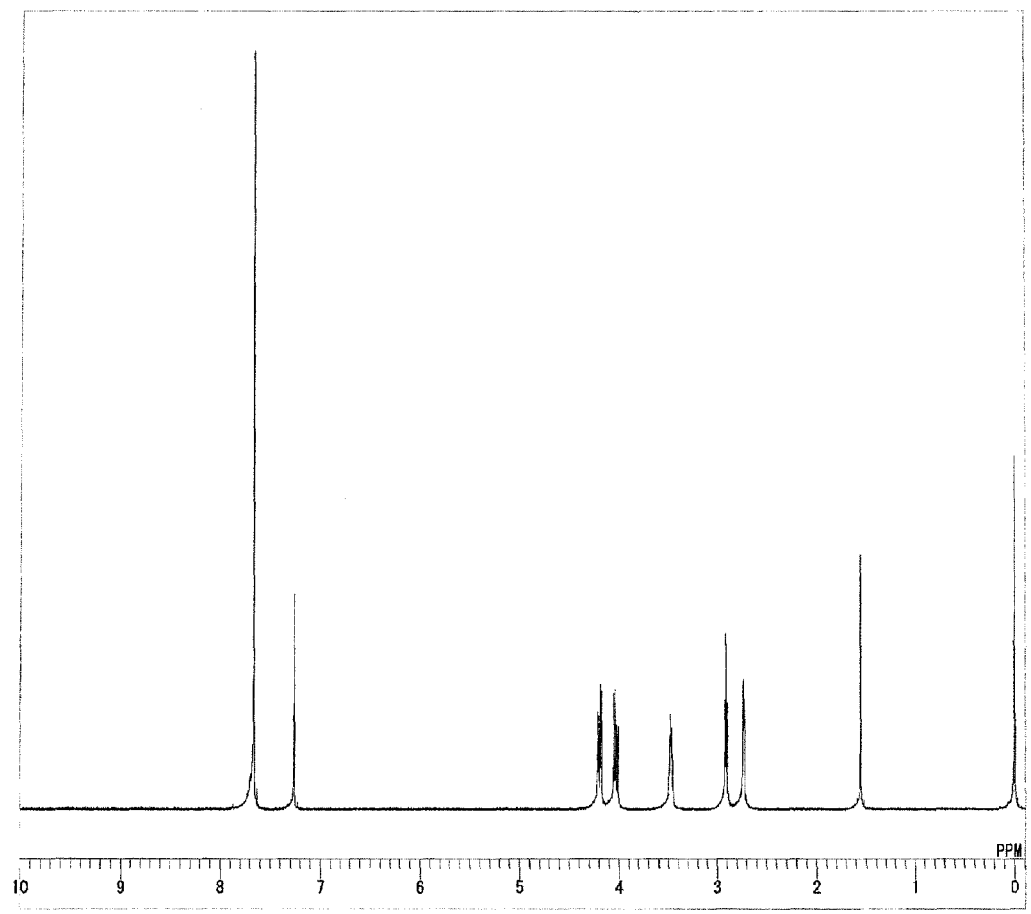
FIG. 1 is a $^1$H-NMR chart of a compound obtained in Synthetic Example 1.

Hereinbelow, embodiments of the present invention will be described in detail.

A polymer of the present invention includes repeating units of the following general formula (1):

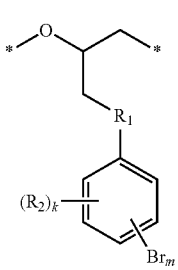

(1)

(wherein
m is an integer of 2 to 5,
k is 5−m,
$R_1$ is an oxygen atom, a NH group or a sulfur atom,
$R_2$ is a hydrogen atom, a fluorine atom, a chlorine atom, an iodine atom, a $C_{1-4}$ alkyl group, a $C_{1-4}$ alkoxy group, a $C_{1-4}$ alkylthio group, a $C_{1-4}$ haloalkyl group, a $C_{1-4}$ haloalkoxy group, a vinyl group, a nitro group, a cyano group, an aldehyde group, an amino group, a hydroxyl group, a thiol group, a sulfo group, a sulfonamide group, or a carboxyl group or ester group, and, when k is 2 or greater, $R_2$'s may be the same as or different from one another, and
the asterisks each indicate an end of the polymer or a bond to other structural unit), and
wherein the bromine content in the polymer is 45 to 80 wt %.

Here, the term "$C_{1-4}$ alkyl group" indicates a monovalent, linear or branched, aliphatic saturated hydrocarbon group having 1 to 4 carbon atoms. Examples include methyl group, ethyl group, propyl group, isopropyl group, butyl group, isobutyl group, s-butyl group and t-butyl group.

The term "$C_{1-4}$ alkoxy group" indicates a group RO— (wherein R is a $C_{1-4}$ alkyl group). Examples include methoxy group, ethoxy group, propoxy group, isopropoxy group, butoxy group, isobutoxy group, s-butoxy group and t-butoxy group.

The term "$C_{1-4}$ alkylthio group" indicates a group R'S— (wherein R' is a $C_{1-4}$ alkyl group). Examples include methylthio group, ethylthio group, propylthio group, isopropylthio group, butylthio group, isobutylthio group, s-butylthio group and t-butylthio group.

The term "$C_{1-4}$ haloalkyl group" indicates a $C_{1-4}$ alkyl group substituted with one or more halogen atoms. Examples include bromomethyl group, 2-bromoethyl group, 3-bromopropyl group, 4-bromobutyl group, iodomethyl group, 2-iodoethyl group, 3-iodopropyl group, 4-iodobutyl group, fluoromethyl group, 2-fluoroethyl group, 3-fluoropropyl group, 4-fluorobutyl group, tribromomethyl group, trichloromethyl group and trifluoromethyl group. In the case where the $C_{1-4}$ alkyl groups are substituted with two or more halogen atoms, the halogen atoms may be the same as or different from one another.

The term "$C_{1-4}$ haloalkoxy group" indicates a $C_{1-4}$ alkoxy group substituted with one or more halogen atoms. Examples include bromomethoxy group, 2-bromoethoxy group, 3-bromopropyloxy group, 4-bromobutyloxy group, iodomethoxy group, 2-iodoethoxy group, 3-iodopropyloxy group, 4-iodobutyloxy group, fluoromethoxy group, 2-fluoroethoxy group, 3-fluoropropyloxy group, 4-fluorobutyloxy group, tribromomethoxy group, trichloromethoxy group and trifluoromethoxy group. In the case where the $C_{1-4}$ alkyl groups are substituted with two or more halogen atoms, the halogen atoms may be the same as or different from one another.

The term "halogen atom" or "halo" is a compatible term and indicates iodine atom, bromine atom, chlorine atom or fluorine atom.

The term "carboxyl group or ester group" indicates a group: —COOH or an ester group thereof (namely, a group: —COOR"). Here, R" is a $C_{1-4}$ alkyl group.

In the general formula (1), $R_1$ may be selected appropriately in accordance with the availability or the easiness in synthesis of the compound, and is preferably an oxygen atom or a NH group, and more preferably an oxygen atom.

In the general formula (1), $R_2$ may be selected appropriately in accordance with the availability or the easiness in synthesis of the compound. To attain a higher bromine content, it is preferable that one or more hydrogen atoms be present as the substituents. More preferably, the substituents are hydrogen atoms or $C_{1-4}$ alkyl groups, and are particularly preferably all hydrogen atoms.

In the general formula (1), the letter m indicating the number of bromine atoms as substituents is 2 to 5, and preferably 3 to 5 from the point of view of the bromine content.

To attain a reduction in dose required for imparting flame retardance, the bromine content in the polymer of the present invention is preferably 45 to 80 wt %, more preferably 50 to 80 wt %, and still more preferably 60 to 80 wt %. In the present invention, the bromine content is a value measured by a method in accordance with JIS K 7229 (flask combustion method).

The polymer of the present invention is not particularly limited as long as the polymer includes repeating units of the general formula (1) above and the bromine content is 45 to 80 wt %. While the polymer of the present invention may include two or more kinds of the repeating units of the general formula (1), the units preferably belong to one or two kinds, and more preferably belong to one kind from the point of view of aspects such as easiness in synthesis. The polymer of the present invention may appropriately include comonomer components other than the repeating units of the general formula (1) in accordance with the purpose or use. Specific examples of such comonomer components include oxirane compounds having one or more three-membered cyclic ethers in the molecule such as ethylene oxide, propylene oxide, styrene oxide, epichlorohydrin and phenyl glycidyl ether; oxetane compounds having one or more four-membered cyclic ethers in the molecule such as oxetane, 2-methyloxetane, 2-chloromethyloxetane and 3-methyl-3-chloromethyloxetane; tetrahydrofuran compounds having one or more five-membered cyclic ethers in the molecule such as tetrahydrofuran, 3,4-dimethyltetrahydrofuran, 3-methyltetrahydrofuran and 2-chloromethyltetrahydrofuran; cyclic esters such as α-acetolactone, β-propiolactone, γ-butyrolactone, δ-valerolactone, ε-caprolactone and 3,4-dihydrocoumarin; cyclic acid anhydrides such as phthalic anhydride, tetrabromophthalic anhydride, maleic anhydride and succinic anhydride; carbon monoxide, carbon dioxide and sulfur dioxide. In particular, oxirane compounds and oxetane compounds are preferable from the point of view of the easiness in copolymerization. From the point of view of the bromine content in the polymer, the polymer of the present invention preferably includes the repeating units of the general formula (1) in not less than 10 mol %, preferably not less than 30 mol %, more preferably not less than 50 mol %, and still more preferably not less than 80 mol %. Most preferably, the polymer of the present invention consists solely of the repeating units of the general formula (1).

The molecular weight of the polymer of the present invention may be selected appropriately in accordance with the purpose or use. To obtain good thermal stability and processability, the polystyrene equivalent weight average molecular weight is preferably 1,000 to 500,000, more preferably 1,000 to 100,000, and still more preferably 1,000 to 50,000.

The molecular chain structure of the polymer of the present invention is not particularly limited and may be selected appropriately in accordance with the purpose or use.

The polymer is preferably a linear polymer, a branched polymer, a cyclic polymer, a star-shaped polymer, a hyperbranched polymer, a dendrimer or a ladder polymer, and more preferably a linear polymer, a branched polymer, a cyclic polymer or a star-shaped polymer.

When, for example, the polymer of the present invention is used as a flame retardant, the 5% weight loss temperature measured by thermogravimetric analysis (TGA) is preferably 200 to 450° C., and more preferably 250 to 450° C. to satisfy the stability required at a processing temperature.

A flame retardant of the present invention includes a polymer which contains repeating units of the general formula (1) described hereinabove and which has a bromine content of 45 to 80 wt %. As used in the present invention, the term flame retardants refers to chemicals used for the purpose of imparting flame retardance to flammable materials such as plastics, rubbers, fibers, paper and wood. The term also comprehends materials that can be used as flame retardant materials by themselves such as the polymers of the present invention.

Methods for producing the polymers of the present invention are not particularly limited, and the polymers may be produced by any methods. For example, the polymers may be produced by ring-opening polymerization of cyclic ethers or polycondensation reactions such as dehydration condensation of diols. Preferably, a monomer of the following general formula (2):

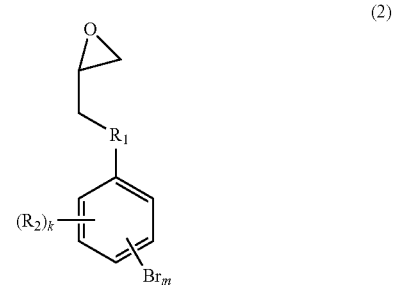

(2)

(wherein m is an integer of 2 to 5, k is 5–m, $R_1$ is an oxygen atom, a NH group or a sulfur atom, $R_2$ is a hydrogen atom, a fluorine atom, a chlorine atom, an iodine atom, a $C_{1-4}$ alkyl group, a $C_{1-4}$ alkoxy group, a $C_{1-4}$ alkylthio group, a $C_{1-4}$ haloalkyl group, a $C_{1-4}$ haloalkoxy group, a vinyl group, a nitro group, a cyano group, an aldehyde group, an amino group, a hydroxyl group, a thiol group, a sulfo group, a sulfonamide group, or a carboxyl group or ester group, and, when k is 2 or greater, $R_2$'s may be the same as or different from one another, and the asterisks each indicate an end of the polymer or a bond to other structural unit)

is polymerized in the presence of a polymerization initiator to give a polymer which includes repeating units of the following general formula (1):

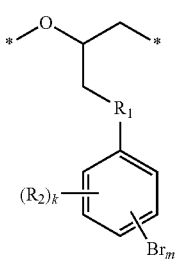

(wherein $R_1$, $R_2$, m, k and the asterisks are as defined hereinabove) and has a bromine content of 45 to 80 wt %.

The monomers of the general formula (2) used in the production methods of the present invention are available in the market and may be readily purchased from such suppliers as Manac Inc. and Nagase ChemteX Corp. Alternatively, the monomers may be synthesized using phenol derivatives and epichlorohydrin in accordance with known methods (for example, the method described in Japanese Patent Application Kokai Publication No. H10-273552). In the monomers of the general formula (2), it is preferable that $R_1$ be an oxygen atom and one or more hydrogen atoms be present as the substituents $R_2$'s. More preferably, $R_2$'s are hydrogen atoms or $C_{1-4}$ alkyl groups. Particularly preferably, $R_2$'s are all hydrogen atoms. Examples of such monomers include dibromo monomers such as dibromophenyl glycidyl ether and dibromocresyl glycidyl ether; tribromo monomers such as tribromophenyl glycidyl ether and tribromocresyl glycidyl ether; tetrabromo monomers such as tetrabromophenyl glycidyl ether; and pentabromo monomers such as pentabromophenyl glycidyl ether.

To polymerize the monomers, polymerization processes such as bulk polymerization, solution polymerization and emulsion polymerization may be used. While the polymerization process may be selected appropriately in accordance with the purpose or use, bulk polymerization and solution polymerization are advantageous in industry and are preferable also because the structures such as molecular weight can be controlled easily.

When it is expected that the monomers being polymerized are liquid, bulk polymerization is preferably selected from the point of view of productivity. The polymerization conditions in bulk polymerization may be selected appropriately in accordance with the types of the monomers used.

When the monomers are polymerized by a solution polymerization process, the solvent used in the polymerization is not particularly limited as long as the solvent is inert in the polymerization reaction and may be selected appropriately without limitation in accordance with the polymerization conditions such as the polymerization mechanism, the types and amounts of the monomers used, the polymerization temperature and the polymerization concentration. Examples include aromatic hydrocarbon solvents such as benzene, toluene, xylene, mesitylene, monochlorobenzene, monobromobenzene, dichlorobenzene and trichlorobenzene; aliphatic hydrocarbon solvents such as n-hexane, n-heptane, n-octane, cyclopentane, cyclohexane, dichloromethane, bromochloromethane, dibromomethane, chloroform, carbon tetrachloride, ethylene dichloride, 1,1,1-trichloroethane and trichloroethylene; ether solvents such as dimethyl ether, diethyl ether, 1,2-dimethoxyethane, tetrahydrofuran, 1,4-dioxane and cyclopentyl methyl ether; amide solvents such as N-methyl-2-pyrrolidone, N,N-dimethylacetamide, N,N-dimethylformamide, 1,3-dimethyl-2-imidazolidinone, tetramethylurea and 1,3-dimethyl-3,4,5,6-tetrahydro-2(1H)-pyrimidinone; ester solvents such as methyl acetate, ethyl acetate, butyl acetate, ethyl propionate, γ-butyrolactone and γ-valerolactone; ketone solvents such as acetone, methyl ethyl ketone, methyl isobutyl ketone, cyclopentanone and cyclohexanone; sulfur-containing solvents such as dimethyl sulfoxide; nitrogen-containing solvents such as picoline and pyridine; and nitrile solvents such as acetonitrile and benzonitrile. These solvents may be used singly, or two or more may be used in combination. Of the above solvents, toluene, xylene, monochlorobenzene, dichloromethane, dibromomethane, tetrahydrofuran, cyclopentyl methyl ether, N-methyl-2-pyrrolidone, N,N-dimethylacetamide, N,N-dimethylformamide, acetone, methyl ethyl ketone, methyl isobutyl ketone, dimethyl sulfoxide and acetonitrile are preferable from the points of view of monomer solubility, less impacts on the human body and the environment, and high availability in industry.

In the polymerization of the monomers by the solution polymerization process, the amount of the solvent used is preferably 10 to 5,000 parts by weight, and more preferably 10 to 3,000 parts by weight per 100 parts by weight of the total of the monomers.

The polymerization mechanism is not particularly limited and may be selected appropriately in accordance with the types and activities of the monomers used. The polymerization process may be based on such a mechanism as cationic ring-opening polymerization, anionic ring-opening polymerization or coordinated anionic ring-opening polymerization.

When the monomers are polymerized using a cationic ring-opening polymerization mechanism, the polymerization may involve a known polymerization initiator as a cationic ring-opening polymerization initiator. The initiator may be selected appropriately without limitation in accordance with the types and activities of the monomers used. Examples include protic acids such as hydrochloric acid, perchloric acid, sulfuric acid, trifluoroacetic acid, fluorosulfuric acid and trifluoromethanesulfonic acid; Lewis acids such as boron trifluoride, aluminum trichloride, phosphorus pentafluoride, titanium tetrachloride, iron trichloride, tin tetrachloride, antimony pentachloride and antimony pentafluoride; cation exchange resins such as Amberlyst (registered trademark) 15 (manufactured by Rohm and Haas Co.), Nafion (registered trademark) (manufactured by DuPont) and Dowex (registered trademark) (manufactured by Dow); solid acid catalysts such as zeolites and activated clays; superacid esters such as methyl trifluoromethanesulfonate and methyl fluorosulfate; superacid anhydrides such as trifluoromethanesulfonic anhydride and fluorosulfuric anhydride; benzyl pyridinium salt compounds such as 1-(4-methoxybenzyl)-4-cyanopyridinium hexafluoroantimonate; sulfonium salt compounds such as benzyltetramethylenesulfonium hexafluorophosphate and p-methoxybenzyltetramethylenesulfonium hexafluoroantimonate; and iodonium salts such as (4-methoxyphenyl)phenyliodonium hexafluoroantimonate. These initiators may be used singly, or two or more may be used in combination.

As the cationic ring-opening polymerization initiator, a Lewis acid may be used as such or in the form of a complex with any of various organic compounds. Examples of the complexes of Lewis acids with organic compounds include ether complexes such as dimethyl ether complexes, diethyl ether complexes and THF (tetrahydrofuran) complexes; carboxylic acid complexes such as acetic acid complexes; alcohol complexes; amine complexes; and phenol complexes.

The amount of the cationic ring-opening polymerization initiator may be selected appropriately without limitation in accordance with, for example, the polymerization conditions such as the types and amounts of the monomers used, the polymerization temperature and the polymerization concentration, and the target molecular weight. In order to obtain a polymer having a polystyrene equivalent weight average molecular weight of 1,000 to 500,000, the amount is preferably 0.01 to 20 mol %, more preferably 0.05 to 15 mol %, and still more preferably 0.1 to 10 mol % relative to the total number of moles of the monomers.

When the monomers are polymerized using a cationic ring-opening polymerization mechanism, the polymerization may involve an active hydrogen-containing compound as required. The use of an active hydrogen-containing compound in the polymerization suppresses the formation of low-molecular weight cyclic components and the product obtained tends to attain a high molecular weight. Exemplary active hydrogen-containing compounds generally used are hydroxyl compounds, amine compounds, carboxylic acid compounds, phenol compounds, phosphoric acid and thiol compounds. Specific examples include hydroxyl compounds such as water, methanol, isopropyl alcohol, phenethyl alcohol, ethylene glycol, diethylene glycol, propylene glycol, 1,4-butanediol, 1,6-hexanediol, polyethylene glycol, polypropylene glycol, glycerol, trimethylolpropane, hexanetriol, pentaerythritol, diglycerol, sorbitol and sucrose; amine compounds such as ethylenediamine, aniline and brominated aniline; carboxylic acid compounds such as benzoic acid and adipic acid; phenol compounds such as phenol, brominated phenol, bisphenol A, brominated bisphenol A, bisphenol S and brominated bisphenol S; and thiol compounds such as ethanedithiol and butanedithiol. These compounds may be used singly, or two or more may be used in combination.

The amount of the active hydrogen-containing compound may be selected appropriately without limitation in accordance with, for example, the polymerization conditions such as the types and amounts of the monomers used, the polymerization temperature and the polymerization concentration, and the target molecular weight. The amount is preferably 0.01 to 20 mol %, more preferably 0.05 to 15 mol %, and still more preferably 0.1 to 10 mol % relative to the total number of moles of the monomers.

In the polymerization of the monomers using a cationic ring-opening polymerization mechanism, the polymerization temperature may be selected appropriately in accordance with, for example, the types and amounts of the monomers used, and the type and amount of the polymerization initiator. The polymerization temperature is preferably −78 to 200° C., and more preferably −50 to 150° C.

When the monomers are polymerized using an anionic ring-opening polymerization mechanism, the polymerization may involve a known polymerization initiator as an anionic ring-opening polymerization initiator. The initiator may be selected appropriately without limitation in accordance with the types and activities of the monomers used. Examples include alkali metals such as lithium, sodium and potassium; alkali metal complexes such as sodium-naphthalene complex and lithium-anthracene complex; alkylalkali metals such as n-butyllithium; Grignard reagents such as phenylmagnesium bromide; metal alkoxides such as sodium methoxide, sodium ethoxide and potassium t-butoxide; alkali metal hydrides such as sodium hydride; alkali metal hydroxides such as sodium hydroxide and potassium hydroxide; alkali metal amides such as sodium amide; amine compounds such as triethylamine and benzylamine; imidazole compounds such as 2-ethyl-4-methylimidazole; quaternary ammonium salts such as tetrabutylammonium fluoride and tetrabutylammonium acetate; and metal porphyrin complexes such as aluminum tetraphenylporphyrin, zinc tetraphenylporphyrin and manganese tetraphenylporphyrin. These initiators may be used singly, or two or more may be used in combination.

The amount of the anionic ring-opening polymerization initiator may be selected appropriately without limitation in accordance with, for example, the polymerization conditions such as the types and amounts of the monomers used, the polymerization temperature and the polymerization concentration, and the target molecular weight of the polymer. In order to obtain a polymer having a polystyrene equivalent weight average molecular weight of 1,000 to 500,000, the amount is preferably 0.01 to 20 mol %, more preferably 0.05 to 15 mol %, and still more preferably 0.1 to 10 mol % relative to the total number of moles of the monomers.

In the polymerization of the monomers using an anionic ring-opening polymerization mechanism, the polymerization temperature may be selected appropriately in accordance with, for example, the types and amounts of the monomers used, and the type and amount of the polymerization initiator. The polymerization temperature is preferably −78 to 200° C., and more preferably −50 to 150° C.

When the monomers are polymerized using a coordinated anionic ring-opening polymerization mechanism, the polymerization may involve a known polymerization initiator as a coordinated anionic ring-opening polymerization initiator. The initiator may be selected appropriately without limitation in accordance with the polymerization conditions such as the types and amounts of the monomers used, the polymerization temperature and the polymerization concentration. Examples include metal alkoxides such as aluminum triisopropoxide, aluminum tri-t-butoxide and iron triethoxide; alkaline earth metal carbonate salts such as strontium carbonate and calcium carbonate; alkaline earth metal oxides such as strontium oxide and calcium oxide; organometallic compounds such as triethylaluminum and diethylzinc; and iron chloride-propylene oxide complex. These initiators may be used singly, or two or more may be used in combination.

As the coordinated anionic ring-opening polymerization initiator, a metal alkoxide may be used singly or in combination with a cocatalyst such as zinc chloride, and an organometallic compound may be used in combination with an active hydrogen-containing compound such as water or alcohol.

The amount of the coordinated anionic ring-opening polymerization initiator may be selected appropriately without limitation in accordance with, for example, the polymerization conditions such as the types and amounts of the monomers used, the polymerization temperature and the polymerization concentration, and the target molecular weight of the polymer. In order to obtain a polymer having a polystyrene equivalent weight average molecular weight of 1,000 to 500,000, the amount is preferably 0.01 to 20 mol %, more preferably 0.05 to 15 mol %, and still more preferably 0.1 to 10 mol % relative to the total number of moles of the monomers.

In the polymerization of the monomers using a coordinated anionic ring-opening polymerization mechanism, the polymerization temperature may be selected appropriately in accordance with, for example, the types and amounts of the monomers used, and the type and amount of the polymerization initiator. The polymerization temperature is preferably −78 to 200° C., and more preferably −50 to 150° C.

In the production method of the present invention, the polymerization time may be selected appropriately in accordance with conditions such as the polymerization mechanism, the amounts and types of the monomers used, the presence or absence of a solvent and the type of the solvent, and the reaction temperature. Usually, the polymerization time is preferably 1 minute to 72 hours and, from the point of view of workability, more preferably 10 minutes to 48 hours.

After the completion of the polymerization, the reaction solution obtained may be treated by a common method to isolate the compound of the general formula (1). The isolation method is not particularly limited and may be, for example, concentrating the polymerization solvent and/or precipitating the solid by adding the polymer solution to a poor solvent.

The polymer isolated may be further purified by a technique such as column chromatography or reprecipitation as required. Where necessary, the polymer may be dried and/or melted and pelletized.

EXAMPLES

Hereinbelow, the present invention will be described based on specific examples. However, the scope of the present invention is not limited to the contents of such examples. The following describes the methods used to measure the 5% weight loss temperatures, the melting points (or the glass transition temperatures), the weight average molecular weights, the bromine contents, the epoxy equivalents, and the NMR and infrared absorption spectra of compounds obtained in Examples and Synthetic Examples.

5% Weight loss temperature: Under a stream of nitrogen, a sample was heated at from 40 to 500° C. at a heating rate of 10° C./min with a simultaneous thermogravimetry/differential thermal analyzer (DTG-60 manufactured by Shimadzu Corp.). The temperature at which the weight was reduced by 5% relative to the weight at the start of the measurement was obtained as the 5% weight loss temperature.

Melting point or glass transition temperature: The temperature was increased from 20 to 200° C. at a rate of 10° C. per minute with a differential scanning calorimeter (DSC-60 manufactured by Shimadzu Corp.). The DSC curve obtained by the measurement was extrapolated to calculate the melting point or the glass transition temperature using an analysis software.

Weight average molecular weight: The measurement was performed by gel permeation chromatography. Standard polystyrenes manufactured by TOSOH CORP. were analyzed beforehand to prepare a calibration curve ranging up to about 1,200,000 of molecular weight. Next, 0.01 g of a sample was dissolved into 10 mL of tetrahydrofuran to give a solution, and 10 μL of the solution was injected into a CCPM system manufactured by TOSOH CORP. The chromatogram obtained was analyzed with a data processor to calculate the weight average molecular weight relative to the standard polystyrenes. The analytical conditions were as follows: columns (TOSOH's TSK-Gel G4000Hxl×1, G3000Hxl×1 and G2000Hxl×24 connected together), mobile phase (tetrahydrofuran), flow rate (1.0 mL/min.), column temperature (40° C.) and detection wavelength (UV 254 nm).

Bromine content: The measurement was performed by a method in accordance with JIS K 7229 (flask combustion method).

Epoxy equivalent: A 300 mL conical flask with a stopper was loaded with 0.2 g of a sample. To the flask, exactly 25 mL of a 0.2 mol/L hydrochloric acid-dioxane solution was added with use of a volumetric pipette. The flask was stoppered and the sample was dissolved sufficiently. The solution was allowed to stand in a dark place at 19 to 21° C. for 15 minutes, and thereafter 30 mL of neutral ethanol was added. Two or three droplets of a cresol red indicator were added, and the solution was titrated with a 0.1 mol/L sodium hydroxide standard solution. The endpoint was determined when the sample changed its color from pink to yellow and finally became purple.

A blank test was performed in parallel with this testing. The epoxy equivalent was calculated using the following equation:

$$\text{Epoxy equivalent} = (10000 \times S) / \{f \times (A-B)\}$$

A: volume of sodium hydroxide standard solution consumed in blank test (mL)
B: volume of sodium hydroxide standard solution consumed in actual test (mL)
S: sample weight (g)
f: factor of sodium hydroxide standard solution NMR: A sample and deuterated chloroform (chloroform-$d_1$ containing 0.05% TMS, manufactured by Wako Pure Chemical Industries, Ltd.) were mixed together to give a solution. The solution was subjected to $^1$H-NMR measurement at 25° C. with NMR (JNM-AL400 manufactured by JEOL Ltd.).

Infrared absorption spectrum: An infrared absorption spectrum was measured by a KBr method using an IR apparatus (Spectrum 100 FT-IR Spectrometer manufactured by PerkinElmer Co., Ltd.).

The following monomers were used in Examples.

Dibromophenyl glycidyl ether: Denacol EX-147 (manufactured by Nagase ChemteX Corp.), bromine content 52 wt %, epoxy equivalent 312 g/eq.

7:3 Mixture of dibromophenyl glycidyl ether and dibromocresyl glycidyl ether: EB-200B (manufactured by Manac Inc.), bromine content 51 wt %, epoxy equivalent 324 g/eq.

Synthetic Example 1

Synthesis of 2,4,6-tribromophenyl glycidyl ether

Figure 2:
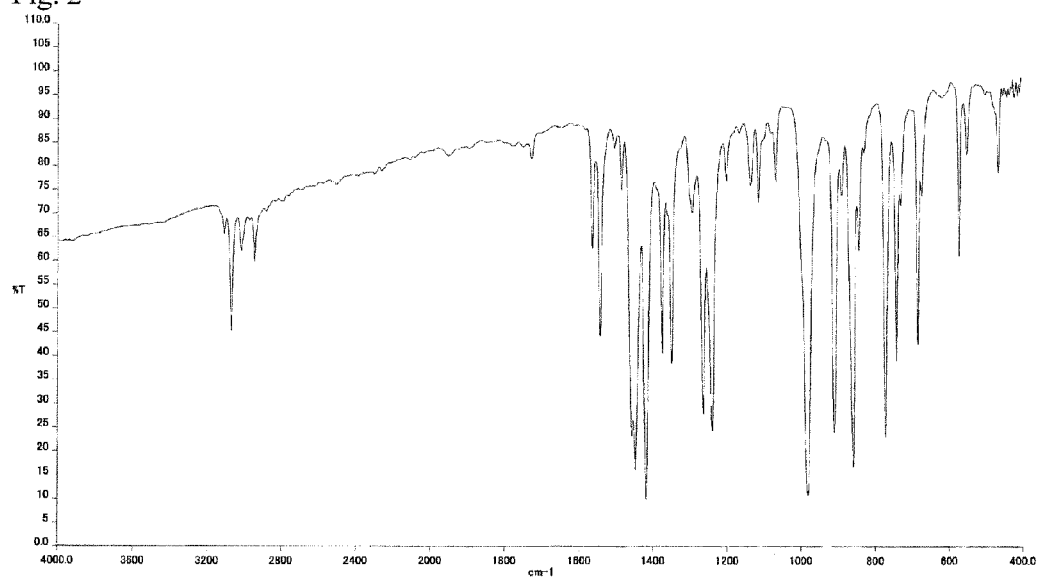
FIG. 2 is an FT-IR chart of the compound obtained in Synthetic Example 1.

A 1 L four-necked flask equipped with a condenser and a thermometer was loaded with 256 g (0.774 mol) of 2,4,6-tribromophenol (manufactured by Manac Inc.), 322 g (3.48 mol) of epichlorohydrin (manufactured by Tokyo Chemical Industry Co., Ltd.) and 125 g of isopropyl alcohol. The mixture was stirred at 35° C. to give a solution. Thereafter, 74 g of a 48% aqueous sodium hydroxide solution was added dropwise over a period of 1.5 hours. The reaction was performed at an inside temperature of 65° C. for 0.5 hours. After the reaction, 168 g of water was added to dissolve the byproduct salt, and the aqueous phase was removed. Under reduced pressure, excess epichlorohydrin and isopropyl alcohol were distilled off. Thereafter, 299 g of methyl isobutyl ketone and 17 g of a 48% aqueous sodium hydroxide solution were added, and the reaction was performed at 75° C. for 1 hour. Additional 399 g of methyl isobutyl ketone was added to the reaction mixture, and the mixture was washed by the addition of water. The washing was repeated five times. The organic phase was then concentrated under reduced pressure, and a white crystal precipitated. The white crystal was filtered off and was washed with 200 mL of methanol. The resultant white crystal was air dried. In this manner, 241 g (0.62 mol) of target 2,4,6-tribromophenyl glycidyl ether was obtained with a yield of 81%. The compound had an epoxy equivalent of 377 g/eq, a bromine content of 62 wt % and a melting point of 116° C. The $^1$H-NMR and the FT-IR chart of the target compound are shown in FIG. 1 and FIG. 2, respectively.

Synthetic Example 2

Synthesis of 2,3,4,5,6-pentabromophenyl glycidyl ether

Figure 3:
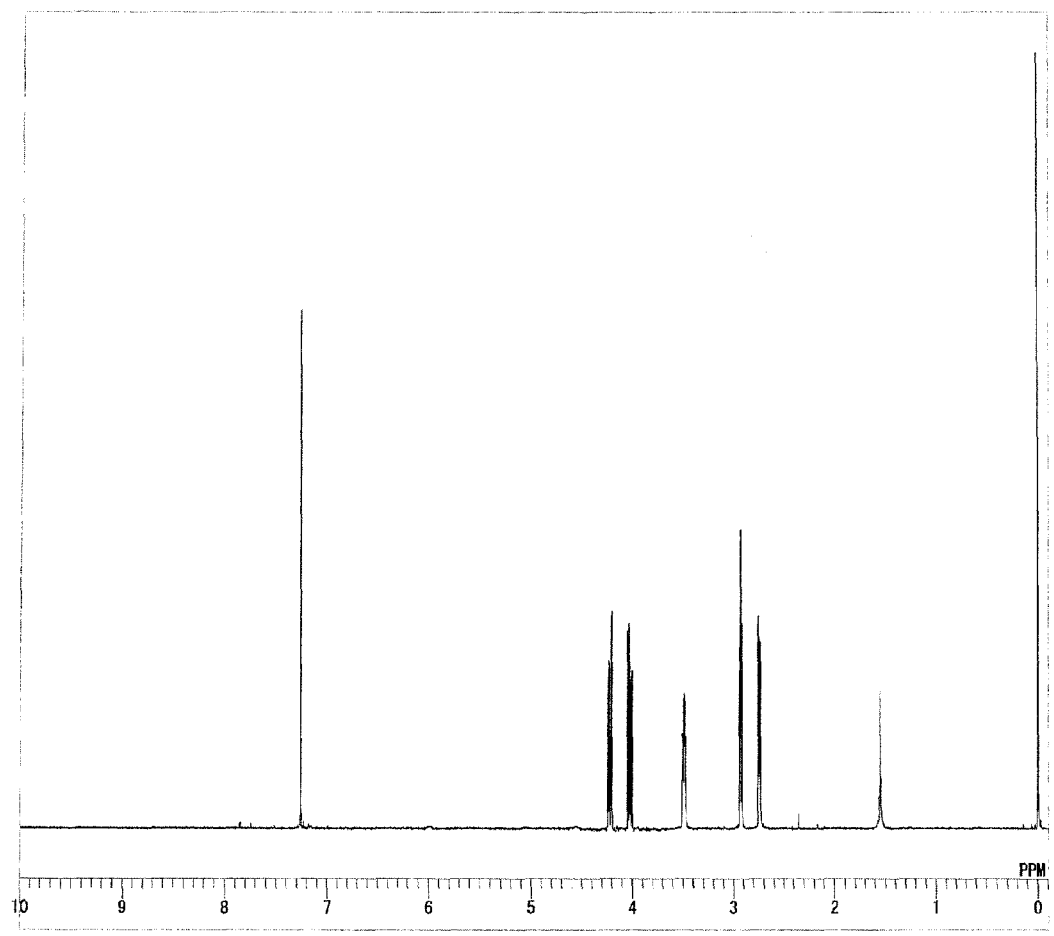
FIG. 3 is a $^1$H-NMR chart of a compound obtained in Synthetic Example 2.
Figure 4:
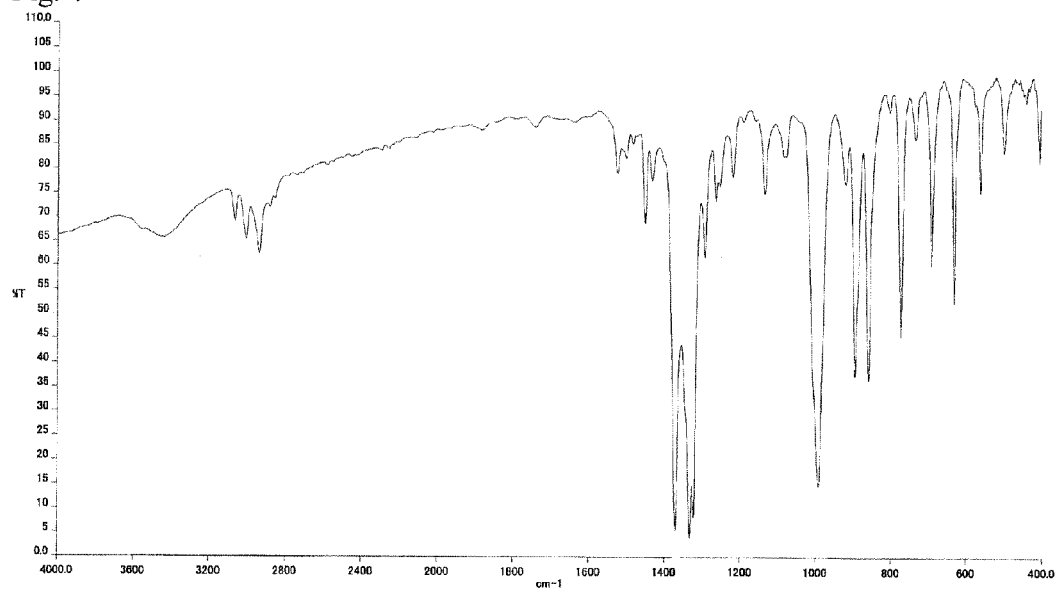
FIG. 4 is an FT-IR chart of the compound obtained in Synthetic Example 2.

Target 2,3,4,5,6-pentabromophenyl glycidyl ether was obtained in an amount of 38 g (70 mmol) in the same manner as in Synthetic Example 1, except that 2,4,6-tribromophenol (manufactured by Manac Inc.) was replaced by 2,3,4,5,6-pentabromophenol (manufactured by Manac Inc.). The yield was 68%. The compound had an epoxy equivalent of 570 g/eq, a bromine content of 73 wt % and a melting point of 169° C. The $^1$H-NMR and the FT-IR chart of the target compound are shown in FIG. 3 and FIG. 4, respectively.

Synthetic Example 3

Synthesis of 2,6-dibromo-4-nitrophenyl glycidyl ether

Figure 5:
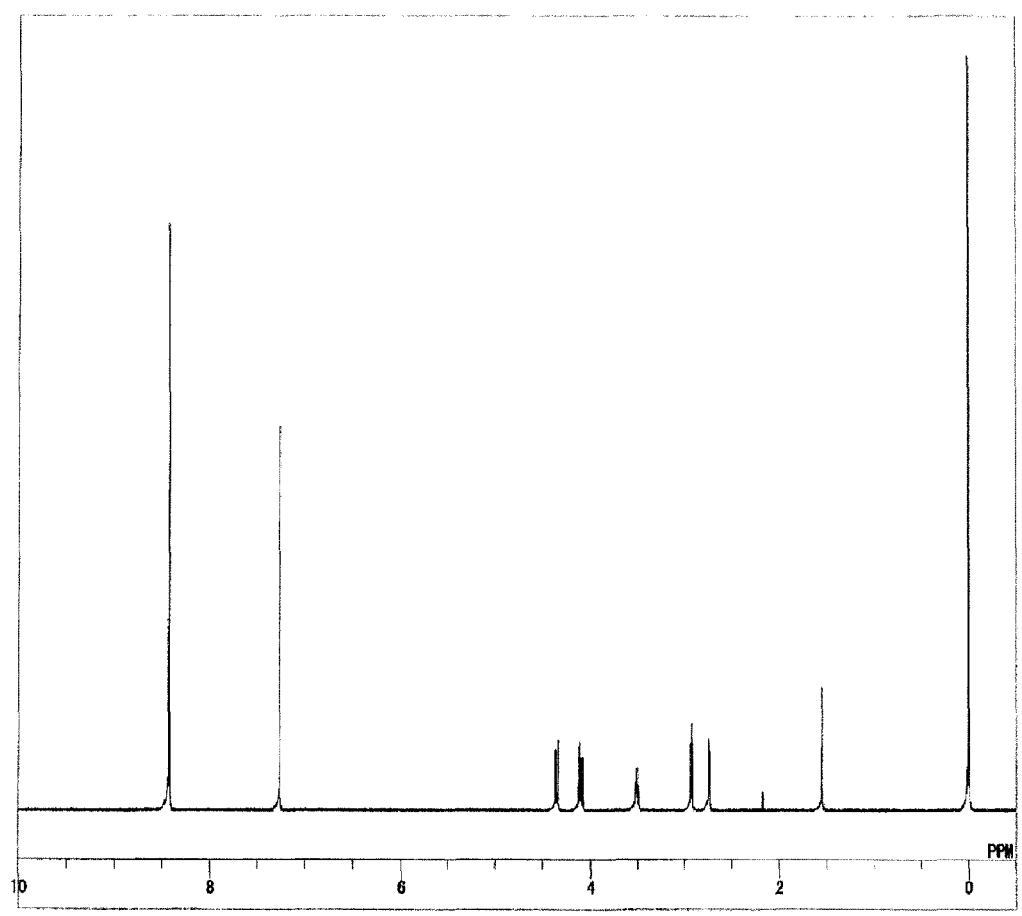
FIG. 5 is a ¹H-NMR chart of a compound obtained in Synthetic Example 3.
Figure 6:
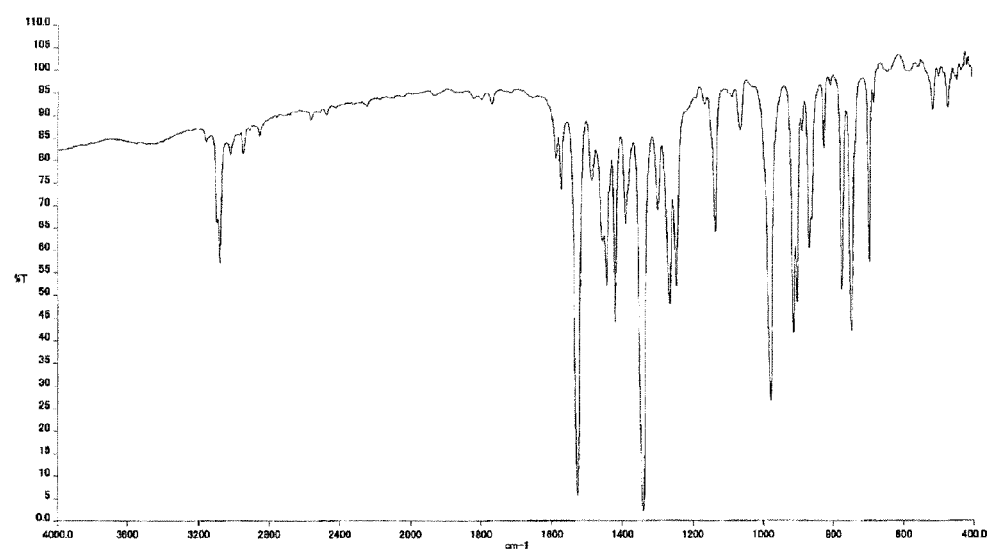
FIG. 6 is an FT-IR chart of the compound obtained in Synthetic Example 3.

Target 2,6-dibromo-4-nitrophenyl glycidyl ether was obtained in an amount of 3.25 g (9.2 mmol) in the same manner as in Synthetic Example 1, except that 2,4,6-tribromophenol (manufactured by Manac Inc.) was replaced by 2,6-dibromo-4-nitrophenol (manufactured by Tokyo Chemical Industry Co., Ltd.). The yield was 63%. The compound had an epoxy equivalent of 355 g/eq, a bromine content of 45 wt % and a melting point of 109° C. The $^1$H-NMR and the FT-IR chart of the target compound are shown in FIG. 5 and FIG. 6, respectively.

Synthetic Example 4

Synthesis of 2,6-dibromo-4-cyanophenyl glycidyl ether

Figure 7:
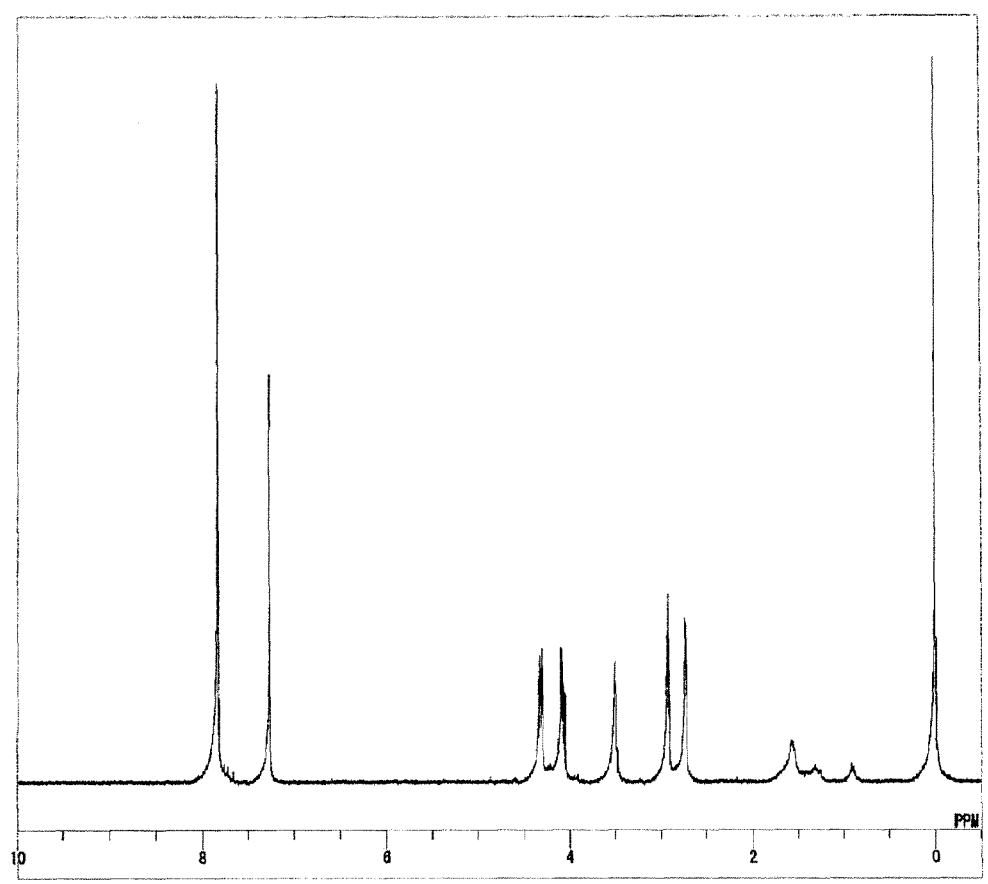
FIG. 7 is a ¹H-NMR chart of a compound obtained in Synthetic Example 4.
Figure 8:
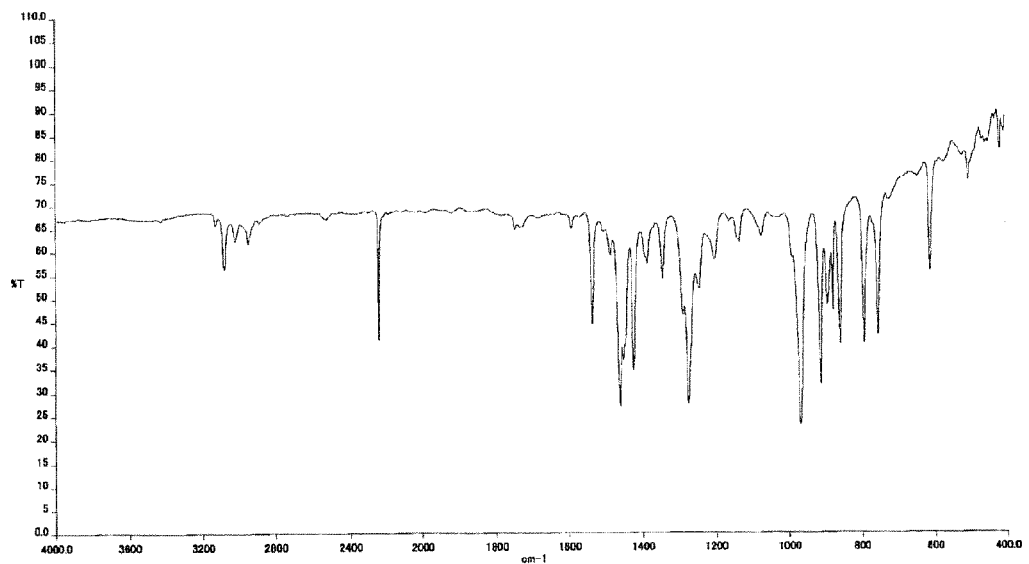
FIG. 8 is an FT-IR chart of the compound obtained in Synthetic Example 4.

Target 2,6-dibromo-4-cyanophenyl glycidyl ether was obtained in an amount of 3.19 g (9.6 mmol) in the same manner as in Synthetic Example 1, except that 2,4,6-tribromophenol (manufactured by Manac Inc.) was replaced by 2,6-dibromo-4-cyanophenol (manufactured by Tokyo Chemical Industry Co., Ltd.). The yield was 52%. The compound had an epoxy equivalent of 345 g/eq, a bromine content of 47 wt % and a melting point of 100° C. The $^1$H-NMR and the FT-IR chart of the target compound are shown in FIG. 7 and FIG. 8, respectively.

Synthetic Example 5

Synthesis of N-(2,3-epoxypropyl)-2,4,6-tribromoaniline

Figure 9:
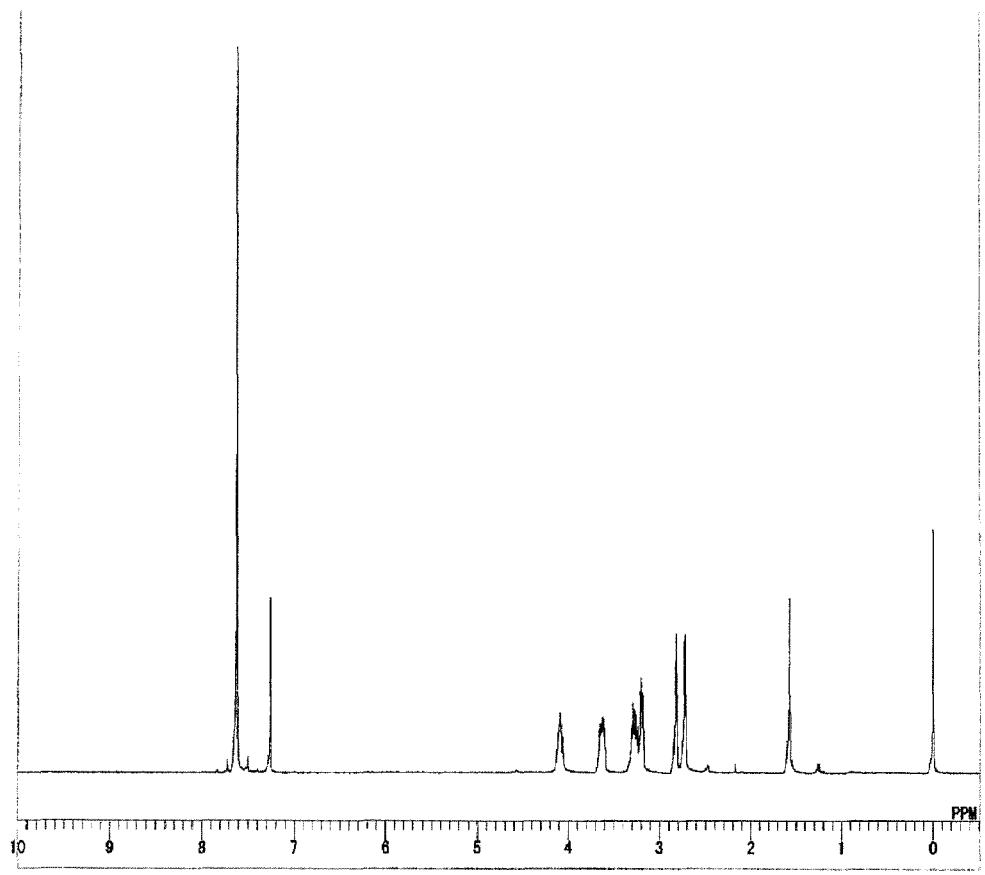
FIG. 9 is a ¹H-NMR chart of a compound obtained in Synthetic Example 5.
Figure 10:
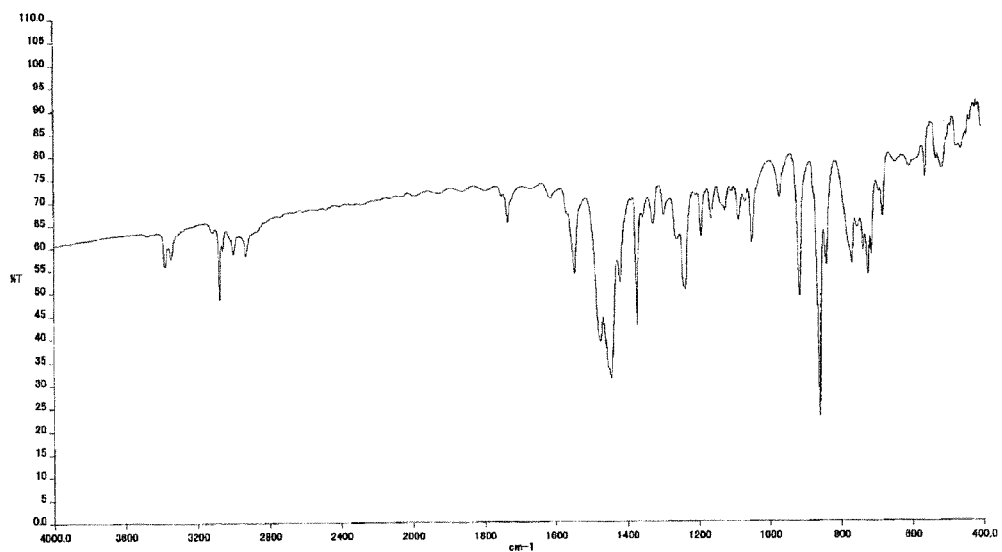
FIG. 10 is an FT-IR chart of the compound obtained in Synthetic Example 5.

A four-necked flask equipped with a condenser and a thermometer was loaded with 100 g (304 mmol) of 2,4,6-tribromoaniline (manufactured by Manac Inc.), 14.6 g (243 mmol) of acetic acid and 23 mL of monochlorobenzene. The mixture was heated to 110° C. Thereafter, stirring was performed for 8 hours while adding dropwise 11.2 g (121 mmol) of epichlorohydrin (manufactured by Tokyo Chemical Industry Co., Ltd.) in four portions. After the completion of the reaction, monochlorobenzene was distilled off and the residue was cooled to room temperature. During this process, excess 2,4,6-tribromoaniline that had been precipitated was removed by filtration. Thereafter, 100 mL of methyl ethyl ketone and 205 g of a 2.5 mol/L aqueous sodium hydroxide solution were added, and the mixture was stirred at a reflux temperature for 1 hour. After the mixture was extracted with monochlorobenzene, the organic phase was concentrated to give a crude product. The crude product was recrystallized from an isopropyl alcohol/heptane (50/50 (by weight)) mixed solvent. In this manner, 16.5 g (42.8 mmol) of target N-(2,3-epoxypropyl)-2,4,6-tribromoaniline was obtained with a yield of 35%. The compound had an epoxy equivalent of 379 g/eq, a bromine content of 61 wt % and a melting point of 40° C. The $^1$H-NMR and the FT-IR chart of the target compound are shown in FIG. 9 and FIG. 10, respectively.

Example 1

Cationic Ring-Opening Polymerization of 2,4,6-tribromophenyl glycidyl ether

Figure 11:
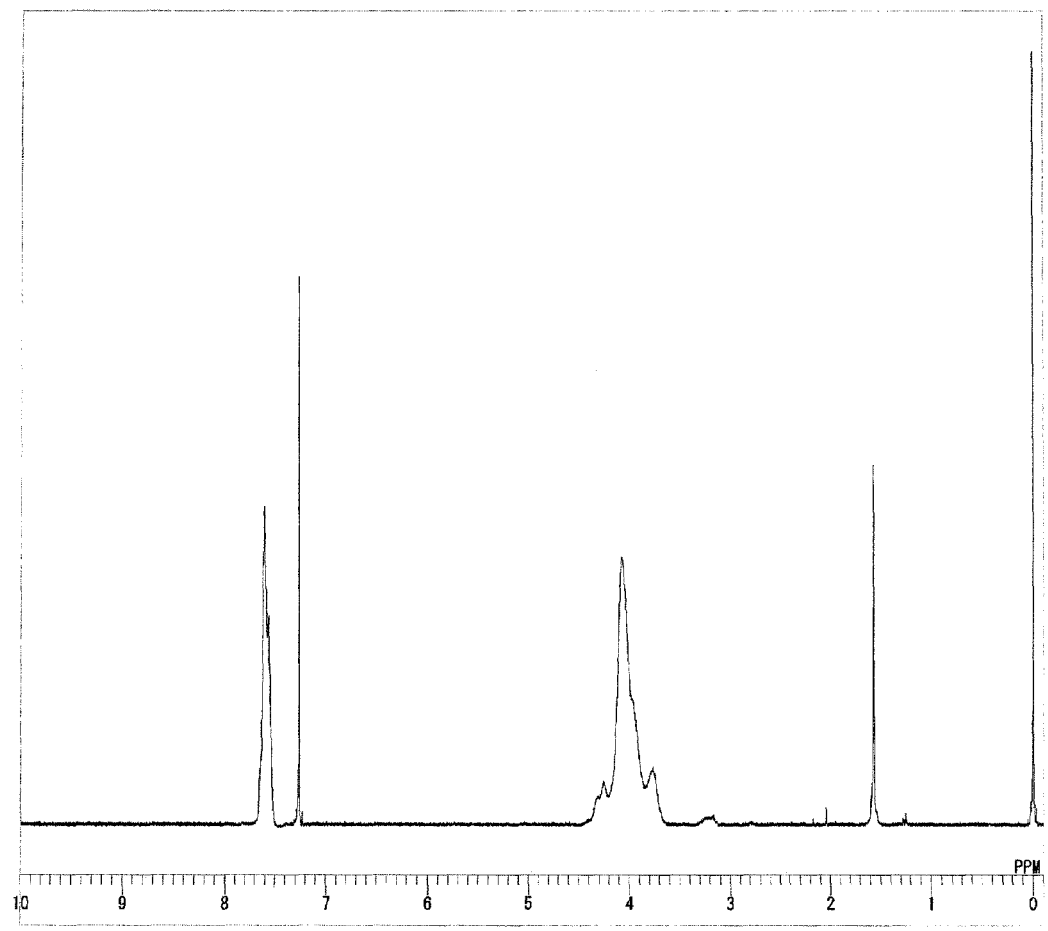
FIG. 11 is a ¹H-NMR chart of a compound obtained in Example 1.
Figure 12:
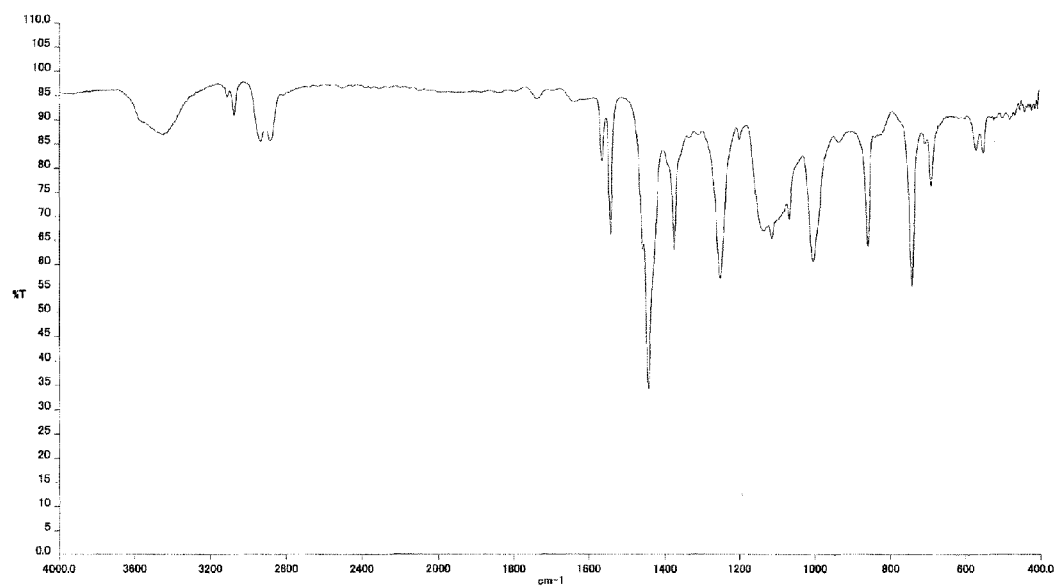
FIG. 12 is an FT-IR chart of the compound obtained in Example 1.

In a nitrogen atmosphere, a 100 mL four-necked flask equipped with a condenser and a thermometer was loaded with 10 g (26 mmol) of 2,4,6-tribromophenyl glycidyl ether synthesized in Synthetic Example 1 and 50 mL of dichloromethane. Thereafter, 0.40 g (1.3 mmol) of antimony pentachloride (manufactured by Sigma-Aldrich Co. LLC.) was added. The mixture was stirred at 17 to 28° C. for 18 hours. After the completion of the reaction, the mixture was washed with 40 g of water and the aqueous phase was removed. Thereafter, 40 g of water was further added and neutralization was performed with a 25% aqueous sodium hydroxide solution until the aqueous phase became neutral. The mixture was allowed to stand and was separated. The organic phase was concentrated under reduced pressure, and the concentrate was reprecipitated with ethyl acetate. The viscous precipitate was collected by removing the liquid phase by decantation. The viscous product obtained was dried at 140° C. under reduced pressure until a constant weight was reached. In this manner, the target product was obtained as a glass-like solid (weight 6.6 g, yield 66%, bromine content 62 wt %, glass transition temperature 52° C., 5% weight loss temperature 345° C., weight average molecular weight 1,400 (Mw/Mn=1.2)). The $^1$H-NMR and the FT-IR chart of the target product are shown in FIG. 11 and FIG. 12, respectively.

Example 2

Cationic Ring-Opening Polymerization of 2,4,6-tribromophenyl glycidyl ether

In a nitrogen atmosphere, a 100 mL four-necked flask equipped with a condenser and a thermometer was loaded with 10 mL of dichloromethane, 0.10 g (0.71 mmol) of boron trifluoride tetrahydrofuran complex (manufactured by Stella Chemifa Corp.) and 0.08 g (0.65 mmol) of phenethyl alcohol (manufactured by Wako Pure Chemical Industries, Ltd.). Stirring was initiated. While keeping the inside temperature at 20 to 22° C., a solution of 10 g (26 mmol) of 2,4,6-tribromophenyl glycidyl ether synthesized in Synthetic Example 1 in 40 mL of dichloromethane was added dropwise over a period of 4 hours. After the completion of the dropwise addition, the reaction mixture was further stirred at an inside temperature of 22 to 25° C. for 12 hours.

Figure 13:
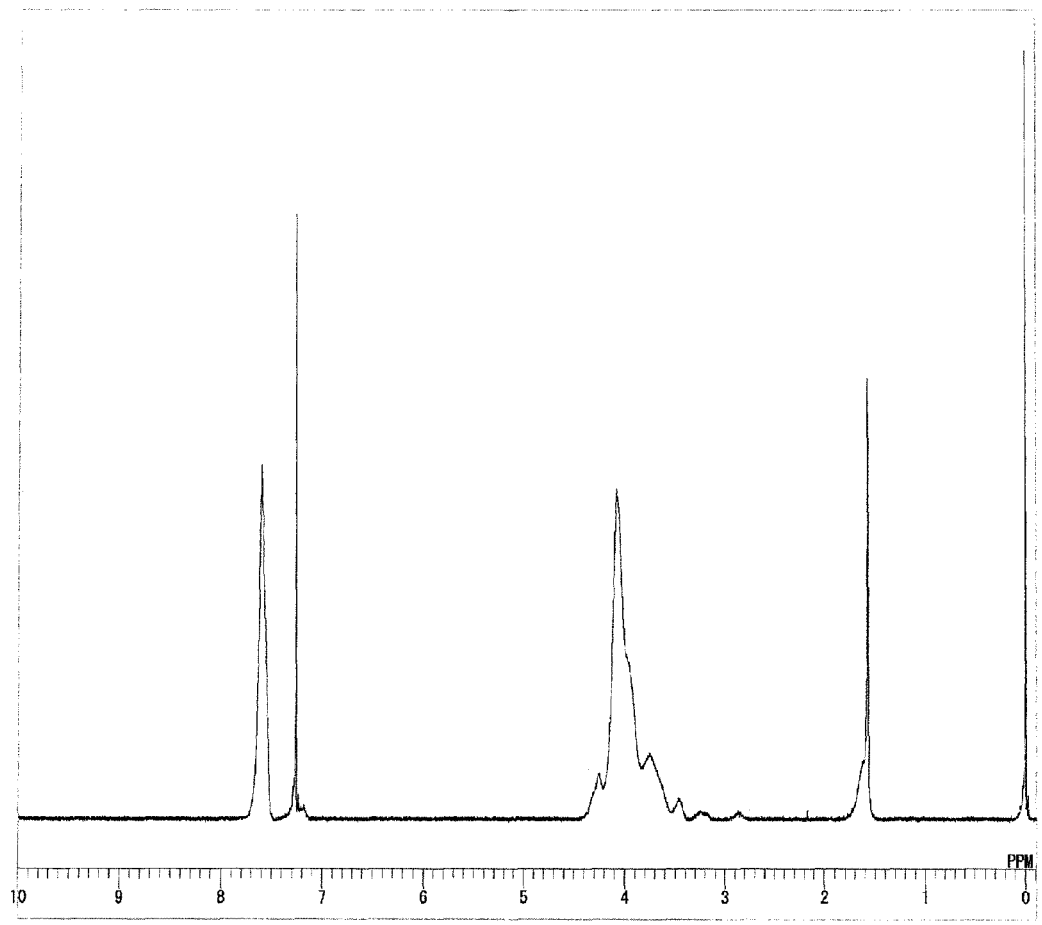
FIG. 13 is a ¹H-NMR chart of a compound obtained in Example 2.
Figure 14:
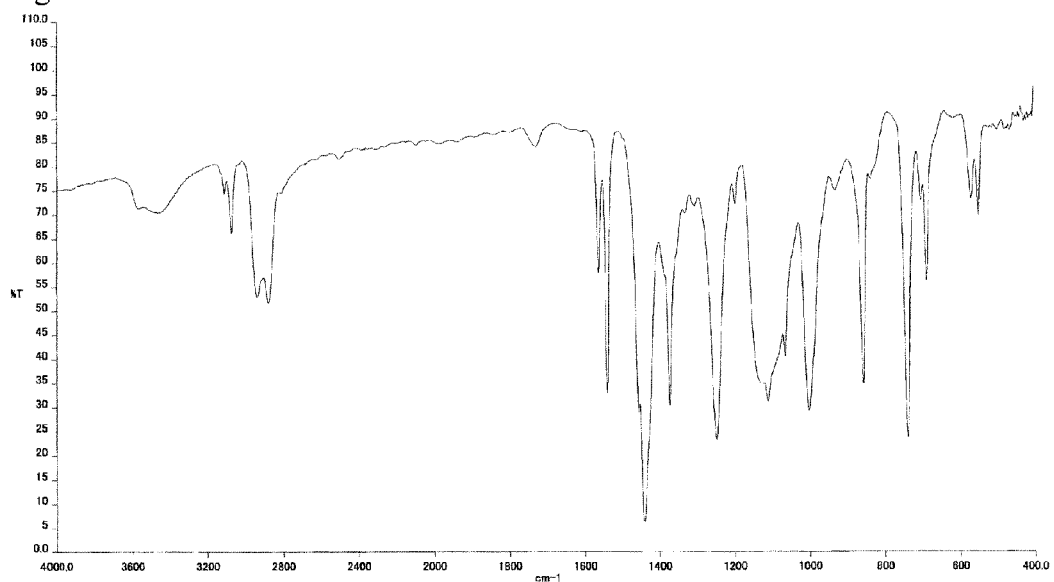
FIG. 14 is an FT-IR chart of the compound obtained in Example 2.

After the completion of the reaction, the similar procedures as in Example 1 were performed. In this manner, the target product was obtained as a glass-like solid (weight 9.0 g, yield 90%, bromine content 62 wt %, glass transition temperature 51° C., 5% weight loss temperature 353° C., weight average molecular weight 1,900 (Mw/Mn=1.3)). The $^1$H-NMR and the FT-IR chart of the target product are shown in FIG. 13 and FIG. 14, respectively.

Example 3

Cationic Ring-Opening Polymerization of 2,4,6-tribromophenyl glycidyl ether

Figure 15:
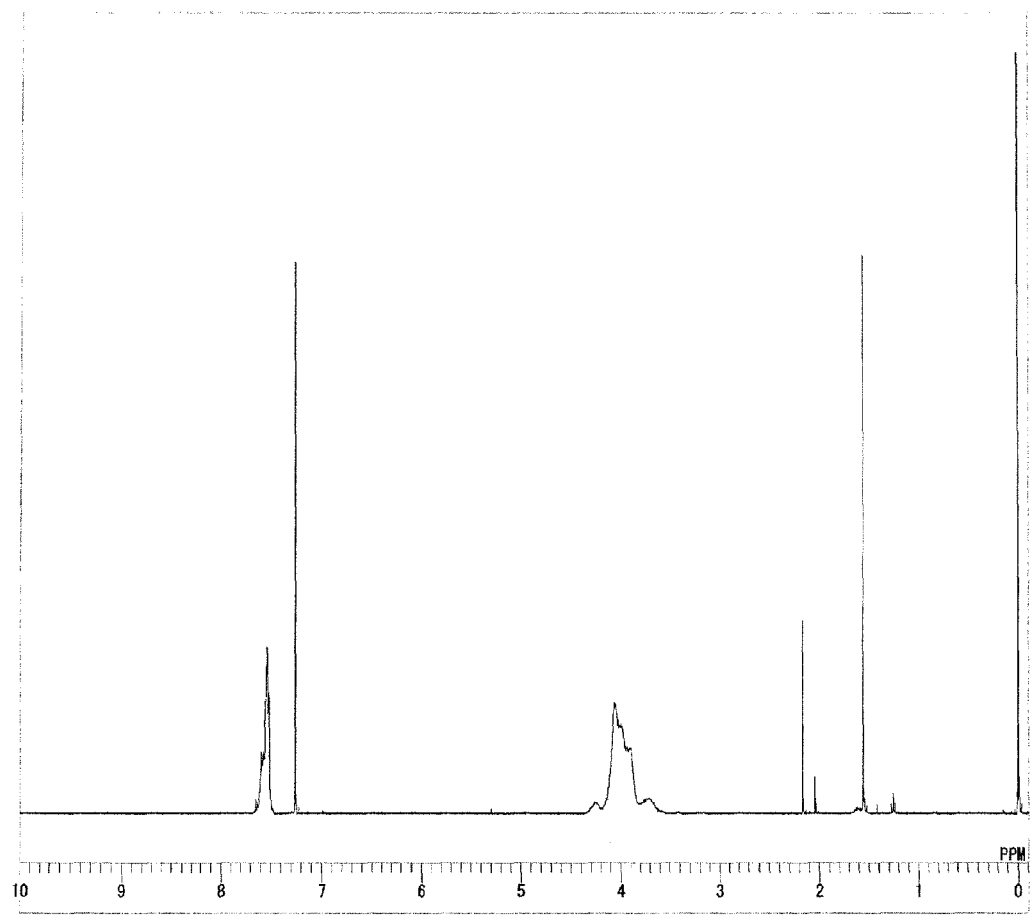
FIG. 15 is a ¹H-NMR chart of a compound obtained in Example 3.
Figure 16:
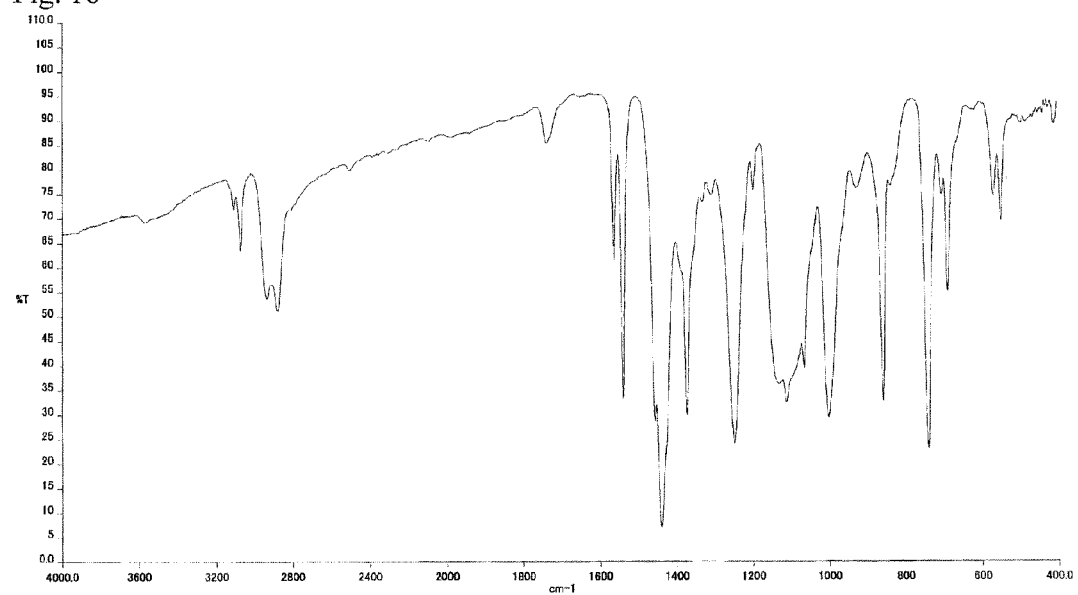
FIG. 16 is an FT-IR chart of the compound obtained in Example 3.

A 500 mL four-necked flask equipped with a condenser and a thermometer was loaded with 40 mL of dichloromethane, 0.22 g (1.6 mmol) of boron trifluoride tetrahydrofuran complex (manufactured by Stella Chemifa Corp.) and 0.15 g (1.7 mmol) of 1,4-butanediol (manufactured by Wako Pure Chemical Industries, Ltd.). Stirring was initiated. A solution of 50 g (129 mmol) of 2,4,6-tribromophenyl glycidyl ether synthesized in Synthetic Example 1 in 200 mL of dichloromethane was added dropwise over a period of 8 hours at an inside temperature of 40 to 42° C. After the completion of the dropwise addition, the reaction mixture was further stirred at an inside temperature of 40 to 42° C. for 3 hours. After the completion of the reaction, the similar procedures as in Example 1 were performed. In this manner, the target product was obtained as a glass-like solid (weight 47 g, yield 94%, bromine content 62 wt %, glass transition temperature 56° C., 5% weight loss temperature 355° C., weight average molecular weight 5,200 (Mw/Mn=1.6)). The $^1$H-NMR and the FT-IR chart of the target product are shown in FIG. 15 and FIG. 16, respectively.

Example 4

Figure 17:
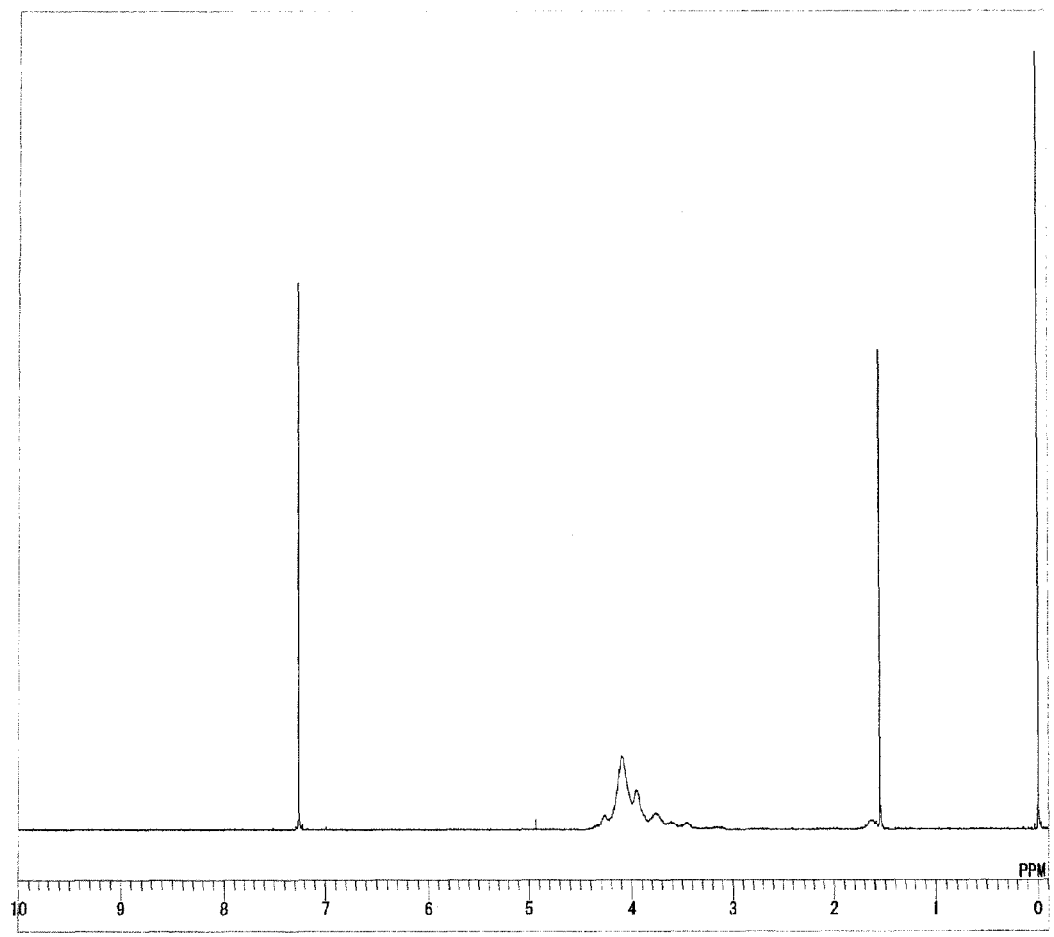
FIG. 17 is a ¹H-NMR chart of a compound obtained in Example 4.
Figure 18:
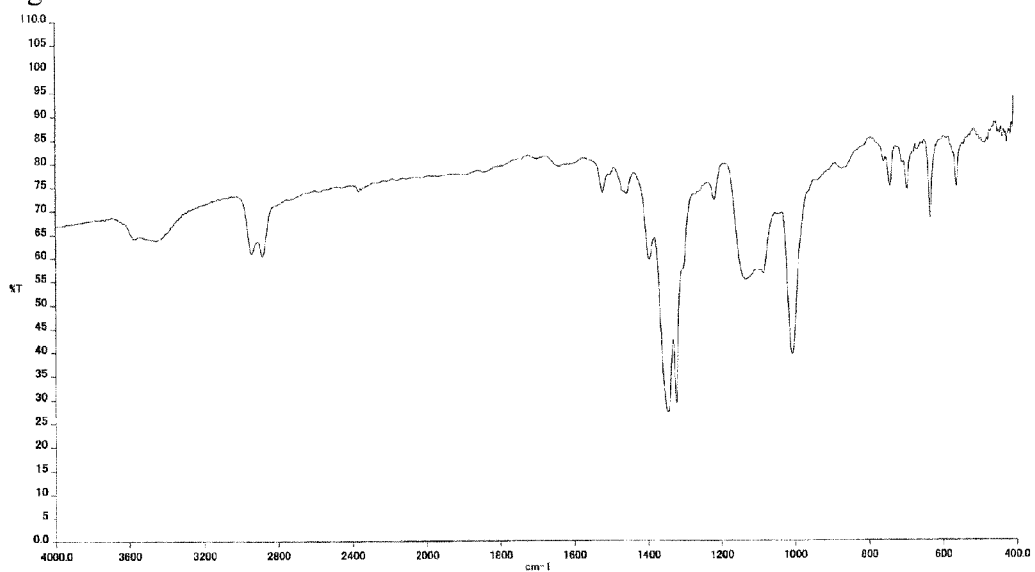
FIG. 18 is an FT-IR chart of the compound obtained in Example 4.

Cationic Ring-Opening Polymerization of 2,3,4,5,6-pentabromophenyl glycidyl ether A 200 mL four-necked flask equipped with a condenser and a thermometer was loaded with 30 mL of dichloromethane, 0.12 g (0.86 mmol) of boron trifluoride tetrahydrofuran complex (manufactured by Stella Chemifa Corp.) and 0.08 g (0.9 mmol) of 1,4-butanediol (manufactured by Wako Pure Chemical Industries, Ltd.). Stirring was initiated. A solution of 10 g (18.3 mmol) of 2,3,4,5,6-pentabromophenyl glycidyl ether synthesized in Synthetic Example 2 in 200 mL of dichloromethane was added dropwise over a period of 8 hours at an inside temperature of 40 to 42° C. After the completion of the dropwise addition, the reaction mixture was further stirred at an inside temperature of 38° C. to 40° C. for 12 hours. After the completion of the reaction, the similar procedures as in Example 1 were performed. In this manner, the target product was obtained as a glass-like solid (weight 8.2 g, yield 82%, bromine content 73 wt %, glass transition temperature 100° C., 5% weight loss temperature 330° C., weight average molecular weight 1,500 (Mw/Mn=1.1)). The $^1$H-NMR and the FT-IR chart of the target product are shown in FIG. 17 and FIG. 18, respectively.

Example 5

Anionic Ring-Opening Polymerization of dibromophenyl glycidyl ether

Figure 19:
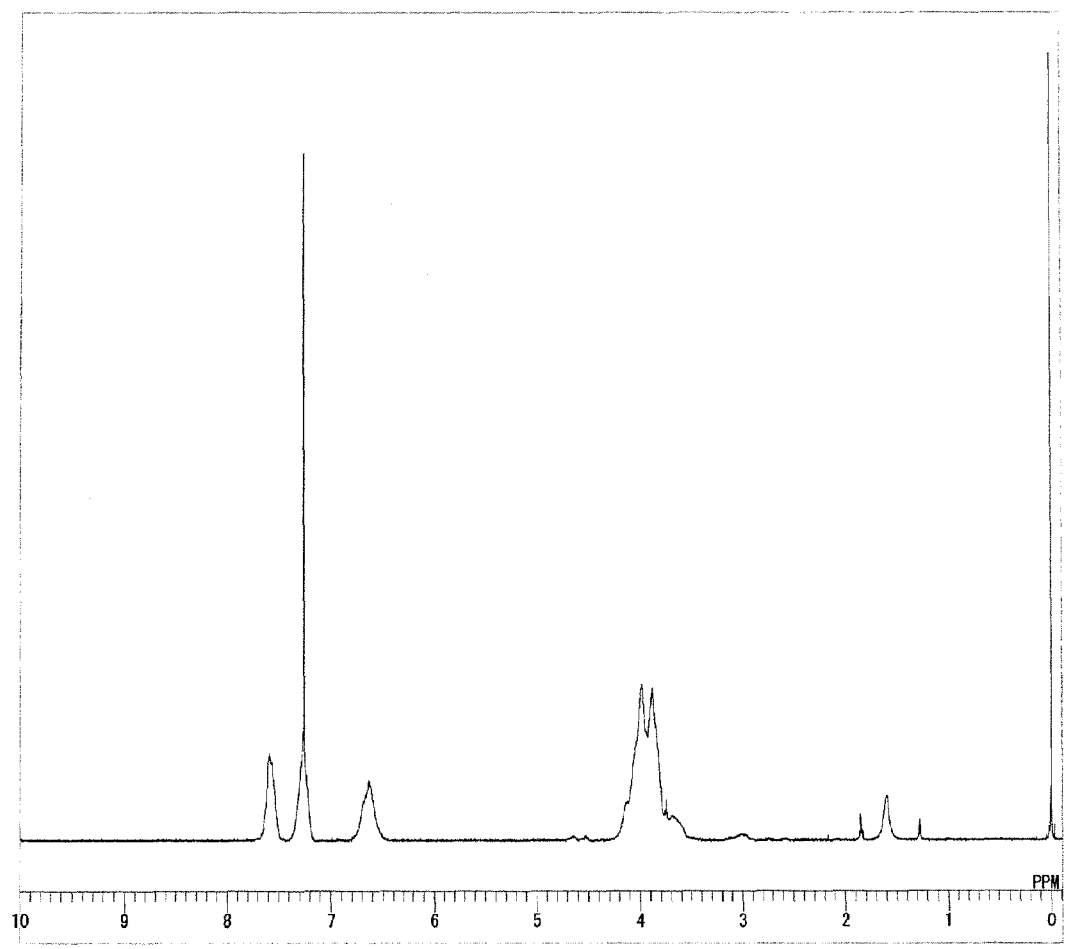
FIG. 19 is a ¹H-NMR chart of a compound obtained in Example 5.
Figure 20:
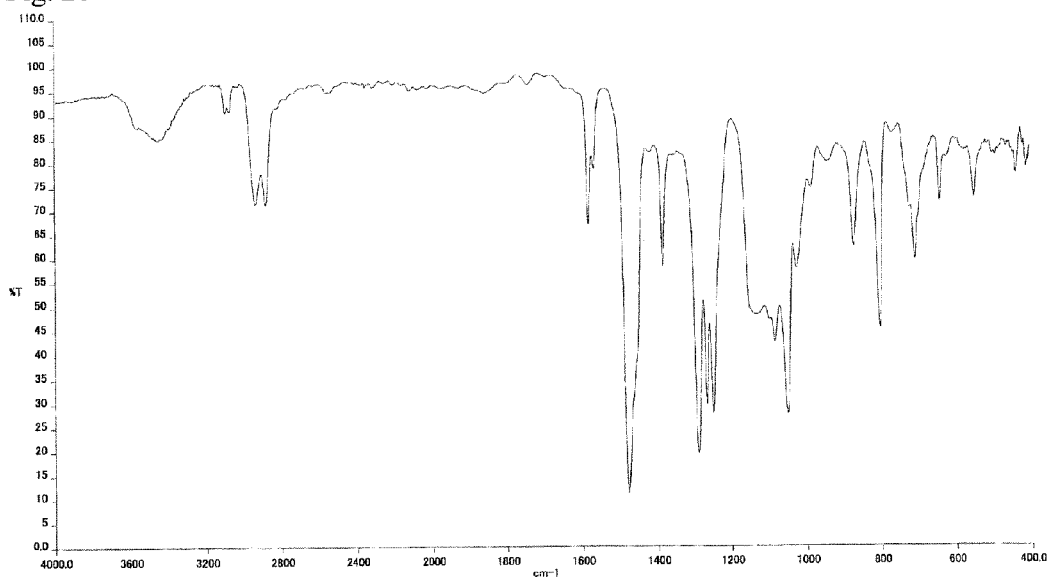
FIG. 20 is an FT-IR chart of the compound obtained in Example 5.

In an argon atmosphere, 2.5 g (8.1 mmol) of dibromophenyl glycidyl ether (Denacol EX-147; manufactured by Nagase ChemteX Corp.) was added to a 30 mL recovery flask, and 0.8 mL (0.8 mmol) of tetrabutylammonium fluoride (1 mol/L tetrahydrofuran solution, d=0.92) (manufactured by Tokyo Chemical Industry Co., Ltd.) was poured into the flask. The mixture was heated to 60° C. and was stirred for 4 hours. After the completion of the reaction, the product was dissolved with 2 mL of tetrahydrofuran and was reprecipitated in a large amount of methanol. The viscous precipitate was collected by removing the liquid phase by decantation. The viscous product obtained was dried at 140° C. under reduced pressure until a constant weight was reached. In this manner, the target product was obtained as a glass-like solid (weight 1.8 g, yield 72%, bromine content 52 wt %, glass transition temperature 35° C., 5% weight loss temperature 351° C., weight average molecular weight 1,600 (Mw/Mn=1.3)). The $^1$H-NMR and the FT-IR chart of the target product are shown in FIG. 19 and FIG. 20, respectively.

Example 6

Figure 21:
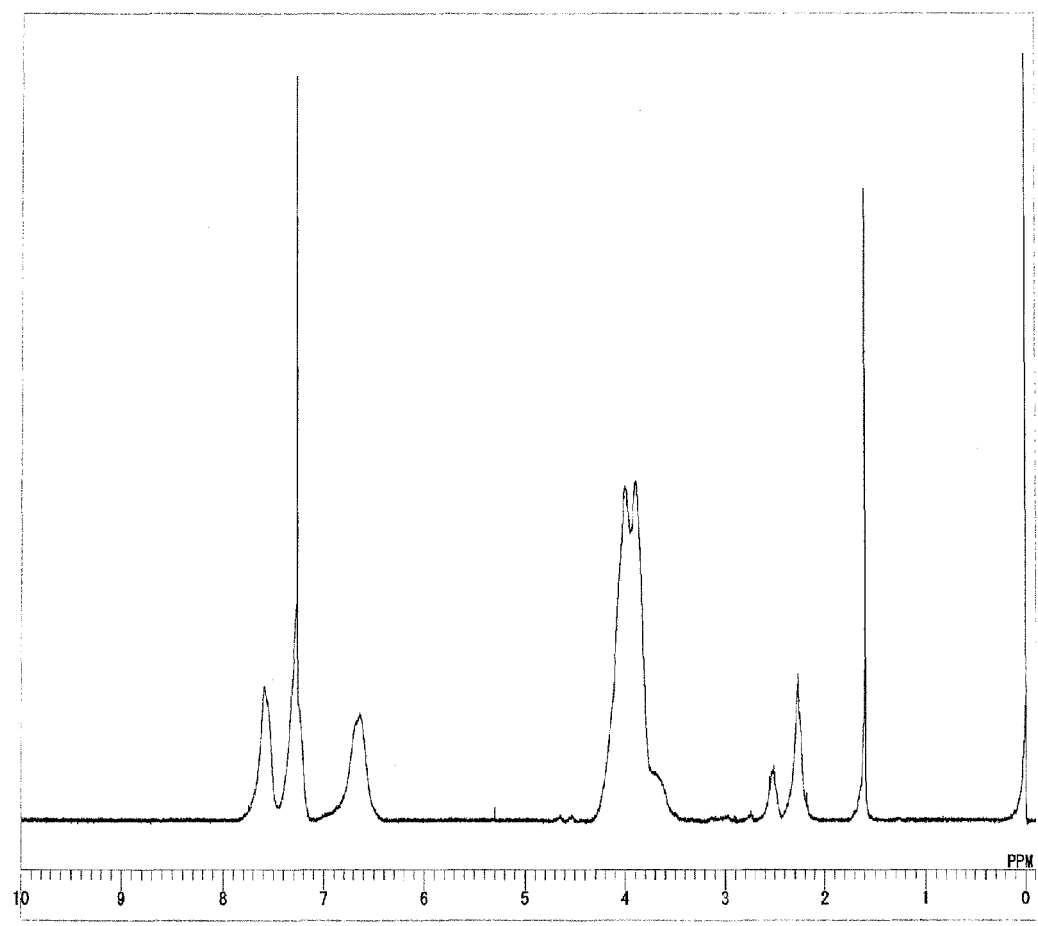
FIG. 21 is a ¹H-NMR chart of a compound obtained in Example 6.
Figure 22:
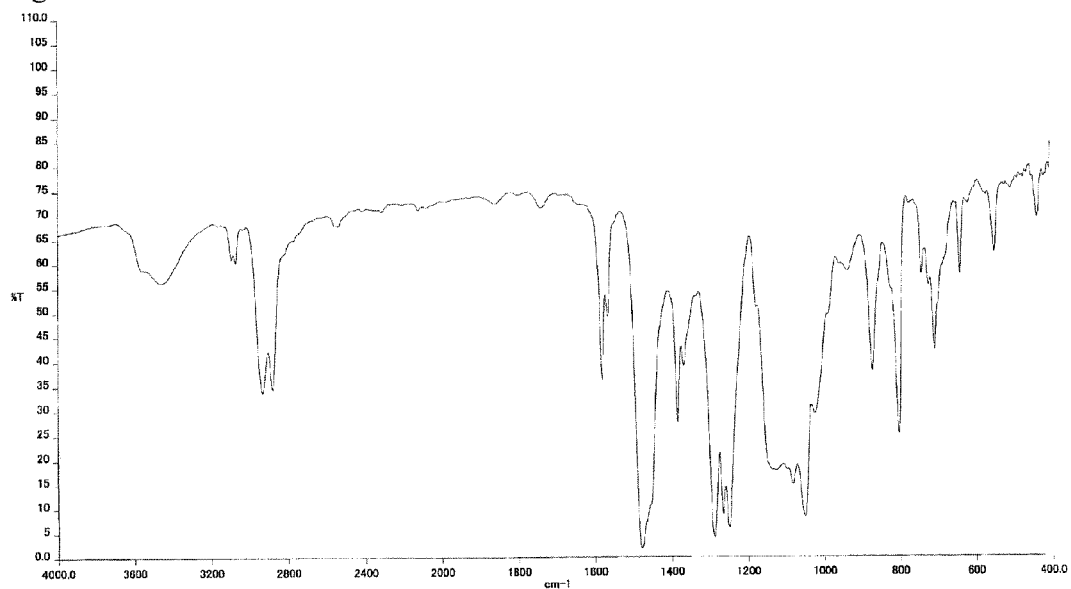
FIG. 22 is an FT-IR chart of the compound obtained in Example 6.

Anionic Ring-Opening Polymerization of 7:3 mixture of dibromophenyl glycidyl ether and dibromocresyl glycidyl ether In an argon atmosphere, 40 g of a 7:3 mixture of dibromophenyl glycidyl ether and dibromocresyl glycidyl ether (EB-200B; manufactured by Manac Inc.) (total number of moles: 128 mmol) was added to a 100 mL four-necked flask equipped with a condenser and a thermometer, and 6.7 mL (6.7 mmol) of tetrabutylammonium fluoride (1 mol/L tetrahydrofuran solution, d=0.92) (manufactured by Tokyo Chemical Industry Co., Ltd.) was poured into the flask. The mixture was heated to 50° C. and was stirred for 48 hours. After the completion of the reaction, the product was dissolved with 20 mL of tetrahydrofuran and was subjected to the similar procedures as in Example 5. In this manner, the target product was obtained as a glass-like solid (weight 35.8 g, yield 89.5%, bromine content 51 wt %, glass transition temperature 42° C., 5% weight loss temperature 358° C., weight average molecular weight 1,700 (Mw/Mn=1.2)). The $^1$H-NMR and the FT-IR chart of the target product are shown in FIG. 21 and FIG. 22, respectively.

Example 7

Figure 23:
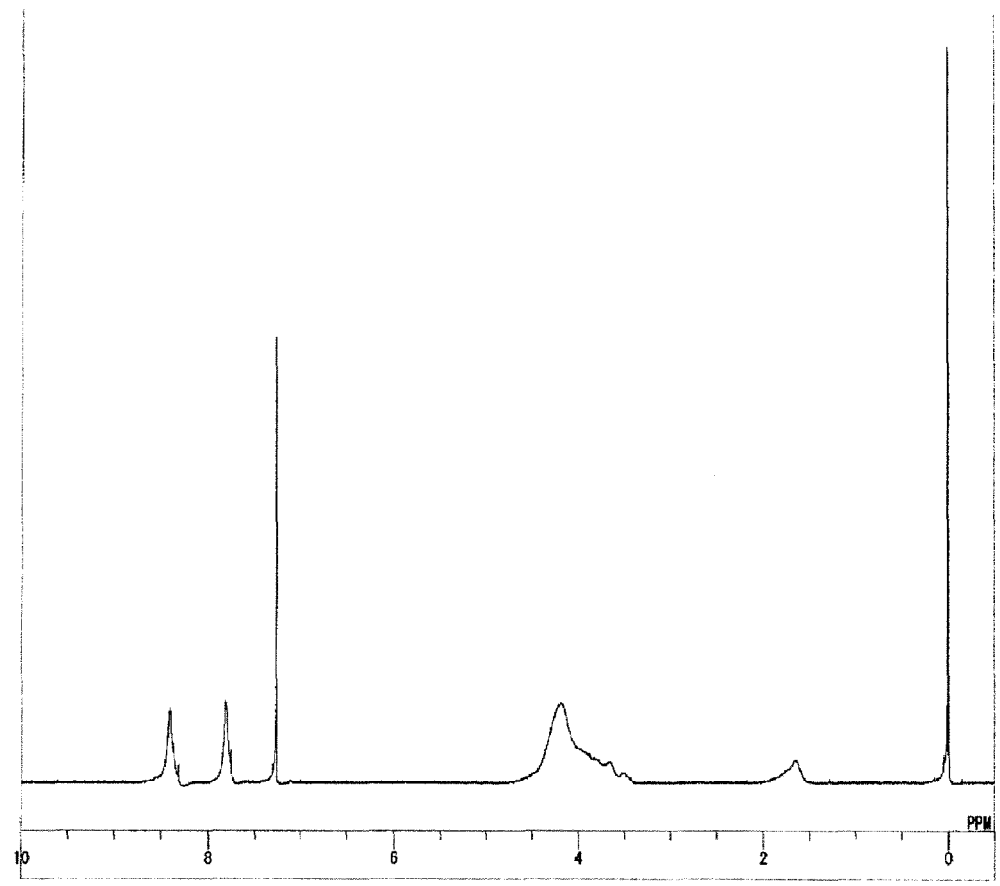
FIG. 23 is a ¹H-NMR chart of a compound obtained in Example 7.
Figure 24:
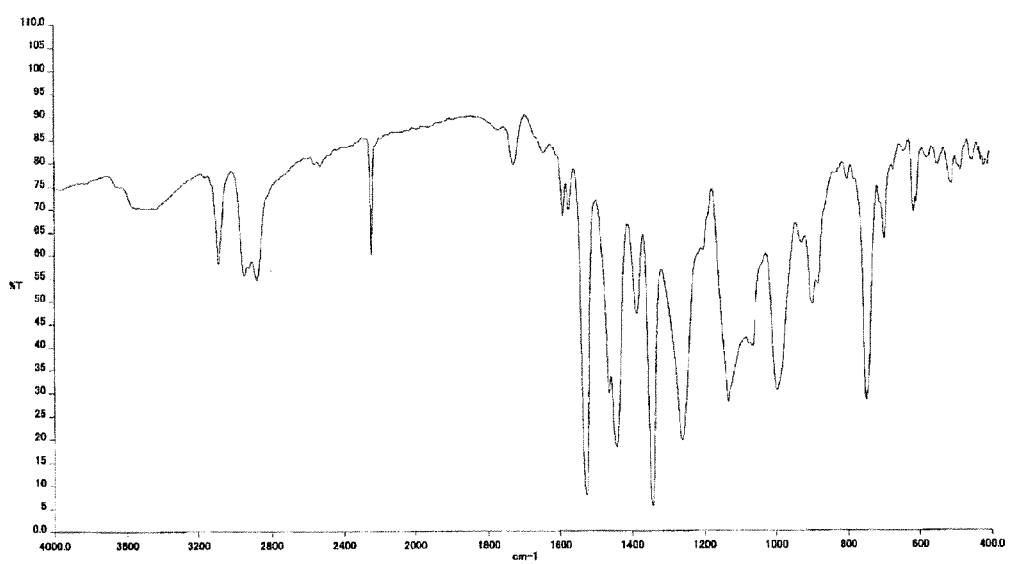
FIG. 24 is an FT-IR chart of the compound obtained in Example 7.

Cationic Ring-Opening Polymerization of 1:1 mixture of 2,6-dibromo-4-nitrophenyl glycidyl ether and 2,6-dibromo-4-cyanophenyl glycidyl ether In an argon atmosphere, a 50 mL recovery flask was loaded with 0.88 g (2.5 mmol) of 2,6-dibromo-4-nitrophenyl glycidyl ether synthesized in Synthetic Example 3, 0.83 g (2.5 mmol) of 2,6-dibromo-4-cyanophenyl glycidyl ether synthesized in Synthetic Example 4, and 5 mL of dichloromethane. Thereafter, 0.04 g (0.29 mmol) of boron trifluoride tetrahydrofuran complex (manufactured by Stella Chemifa Corp.) was added. The mixture was stirred at 10 to 22° C. for 4 hours. After the completion of the reaction, the reaction mixture was washed with water until the organic phase became neutral. The reaction mixture was then allowed to stand and was separated, and the organic phase was reprecipitated with a hydrogen chloride methanol solution. The viscous precipitate was collected by removing the liquid phase by decantation. The viscous product obtained was dried at 140° C. under reduced pressure until a constant weight was reached. In this manner, the target product was obtained as a glass-like solid (weight 0.90 g, yield 53%, bromine content 47 wt %, glass transition temperature 62° C., 5% weight loss temperature 268° C., weight average molecular weight 2,200 (Mw/Mn=1.7)). The ¹H-NMR and the FT-IR chart of the target product are shown in FIG. 23 and FIG. 24, respectively.

Example 8

Figure 25:
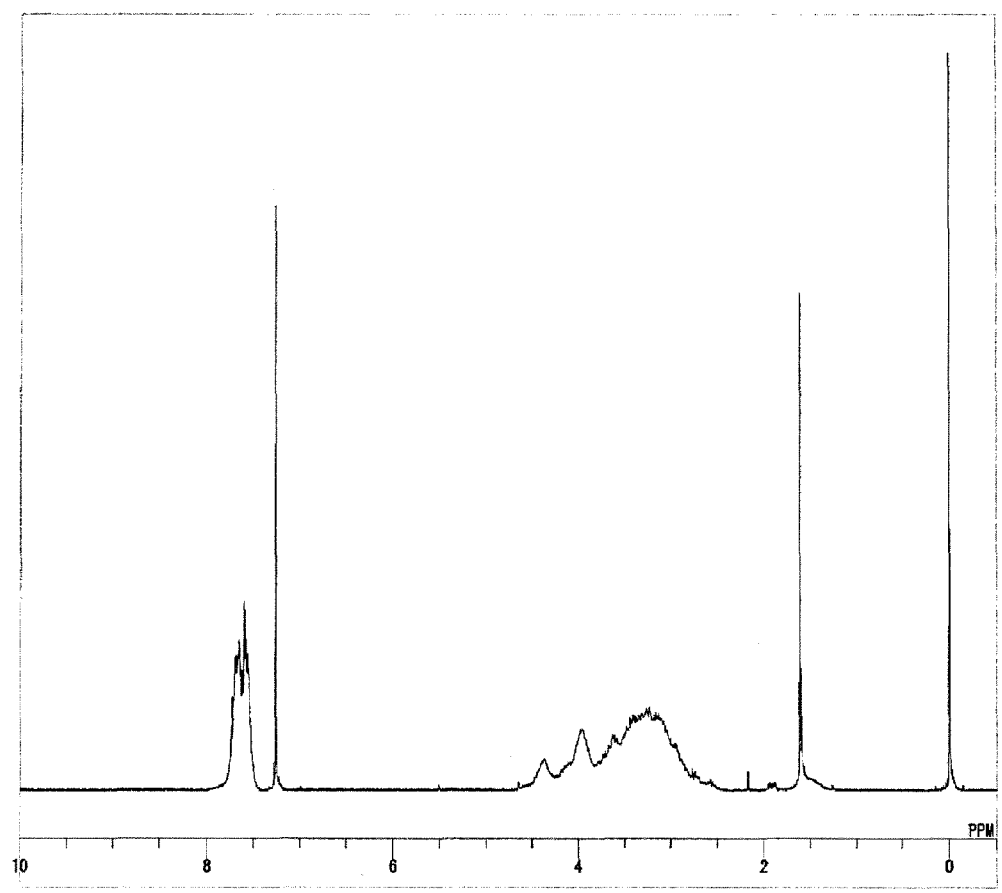
FIG. 25 is a ¹H-NMR chart of a compound obtained in Example 8.
Figure 26:
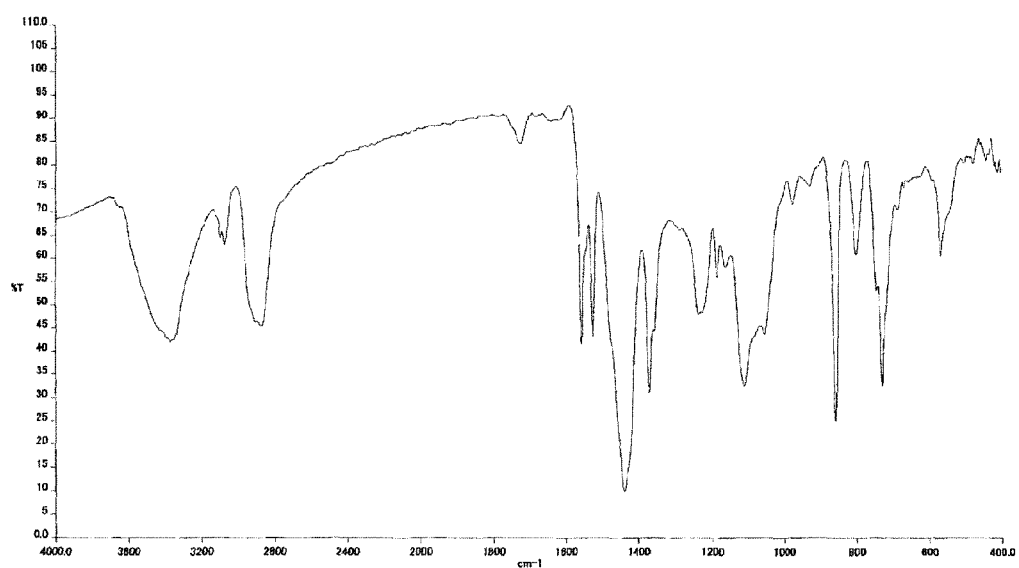
FIG. 26 is an FT-IR chart of the compound obtained in Example 8.

Cationic Ring-Opening Polymerization of N-(2,3-epoxypropyl)-2,4,6-tribromoaniline In an argon atmosphere, a 50 mL recovery flask was loaded with 3.86 g (10 mmol) of N-(2,3-epoxypropyl)-2,4,6-tribromoaniline synthesized in Synthetic Example 5 and 5 mL of dichloromethane. Thereafter, 0.08 g (0.6 mmol) of boron trifluoride tetrahydrofuran complex (manufactured by Stella Chemifa Corp.) was added. The mixture was stirred at 10 to 26° C. for 4 hours. After the completion of the reaction, the similar procedures as described in Example 7 were performed. In this manner, the target product was obtained as a glass-like solid (weight 2.91 g, yield 75%, bromine content 62 wt %, glass transition temperature 78° C., 5% weight loss temperature 326° C., weight average molecular weight 1,100 (Mw/Mn=1.6)). The ¹H-NMR and the FT-IR chart of the target product are shown in FIG. 25 and FIG. 26, respectively.

INDUSTRIAL APPLICABILITY

The bromine-containing polyether polymers of the present invention contain bromine in a high content and are thus useful as flame retardants. Further, the bromine-containing polyether polymers of the present invention have excellent thermal stability and are therefore applicable as flame retardants even to resins that are processed at high temperatures. Furthermore, the addition of the polymers to plastics potentially ensures good melt flow properties and non-blooming properties.

The disclosure of Japanese Patent Application No. 2014-018165 (filed: Feb. 3, 2014) is incorporated herein by reference in its entirety.

All publications, patent applications and technical standards mentioned in the present specification are herein incorporated by reference to the same extent as if each individual publication, patent application or technical standard was specifically and individually so incorporated by reference.

The invention claimed is:

1. A polymer comprising repeating units of the following general formula (1):

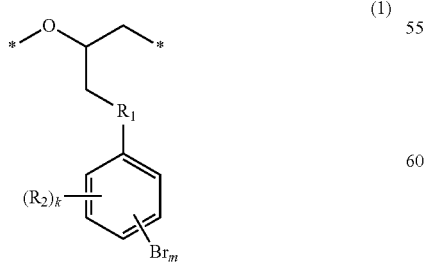

(1)

wherein m is an integer of 2 to 5, k is 5−m, $R_1$ is an oxygen atom, a NH group or a sulfur atom, $R_2$ is a hydrogen atom, a fluorine atom, a chlorine atom, an iodine atom, a $C_{1-4}$ alkyl group, a $C_{1-4}$ alkoxy group, a $C_{1-4}$ alkylthio group, a $C_{1-4}$ haloalkyl group, a $C_{1-4}$ haloalkoxy group, a vinyl group, a nitro group, a cyano group, an aldehyde group, an amino group, a hydroxyl group, a thiol group, a sulfo group, a sulfonamide group, or a carboxyl group or ester group, and, when k is 2 or greater, $R_2$'s may be the same as or different from one another, and the asterisks each indicate an end of the polymer or a bond to other structural unit, wherein repeating units of general formula (1) are included in the polymer in not less than 50 mol %; and wherein the bromine content in the polymer is 45 to 80 wt %.

2. The polymer according to claim 1, wherein the bromine content is 50 wt % to 80 wt %.

3. The polymer according to claim 1, wherein $R_1$ is an oxygen atom.

4. The polymer according to claim 1, wherein $R_2$ or $R_2$'s are all hydrogen atoms.

5. The polymer according to claim 1, wherein the 5% weight loss temperature measured by thermogravimetric analysis (TGA) is 200° C. to 450° C.

6. A flame retardant comprising the polymer according to claim 1.

7. A method for producing a polymer according to claim 1, comprising polymerizing a monomer of the following general formula (2):

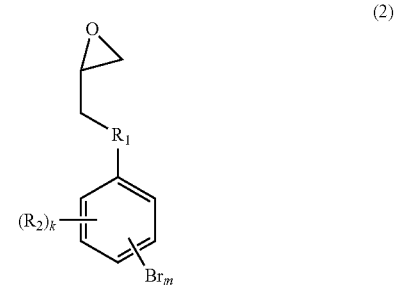

(2)

wherein m is an integer of 2 to 5, k is 5−m, $R_1$ is an oxygen atom, a NH group or a sulfur atom, $R_2$ is a hydrogen atom, a fluorine atom, a chlorine atom, an iodine atom, a $C_{1-4}$ alkyl group, a $C_{1-4}$ alkoxy group, a $C_{1-4}$ alkylthio group, a $C_{1-4}$ haloalkyl group, a $C_{1-4}$ haloalkoxy group, a vinyl group, a nitro group, a cyano group, an aldehyde group, an amino group, a hydroxyl group, a thiol group, a sulfo group, a sulfonamide group, or a carboxyl group or ester group, and, when k is 2 or greater, $R_2$'s may be the same as or different from one another, in the presence of a polymerization initiator.

8. The production method according to claim 7, wherein the polymerization is performed using a cationic ring-opening polymerization mechanism.

9. The production method according to claim 8, wherein the polymerization initiator is a Lewis acid.

10. The production method according to claim 9, wherein the polymerization further involves an active hydrogen-containing compound.

11. The production method according to claim 10, wherein the active hydrogen-containing compound is a hydroxyl compound.

12. The production method according to claim 7, wherein the polymerization is performed using an anionic ring-opening polymerization mechanism.

13. The production method according to claim 12, wherein the polymerization initiator is a quaternary ammonium salt.

14. The production method according to claim 13, wherein the ammonium salt is tetrabutylammonium fluoride.

* * * * *